US007567252B2

(12) United States Patent
Buck et al.

(10) Patent No.: US 7,567,252 B2
(45) Date of Patent: Jul. 28, 2009

(54) OPTIMIZING PERFORMANCE OF A GRAPHICS PROCESSING UNIT FOR EFFICIENT EXECUTION OF GENERAL MATRIX OPERATIONS

(75) Inventors: Ian Andrew Buck, Mountain View, CA (US); David W. Steinkraus, Santa Fe, NM (US); Richard S. Szeliski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 901 days.

(21) Appl. No.: 10/877,730

(22) Filed: Jun. 25, 2004

(65) Prior Publication Data

US 2005/0197977 A1 Sep. 8, 2005

Related U.S. Application Data

(60) Provisional application No. 60/528,400, filed on Dec. 9, 2003.

(51) Int. Cl.
G06F 15/00 (2006.01)
(52) U.S. Cl. .................................................. 345/501
(58) Field of Classification Search .................. 345/501
See application file for complete search history.

(56) References Cited

U.S. PATENT DOCUMENTS

| 5,977,977 | A  | * | 11/1999 | Kajiya et al. | 345/418 |
| 6,483,505 | B1 | * | 11/2002 | Morein et al. | 345/419 |
| 6,784,888 | B2 | * | 8/2004  | Taylor et al. | 345/522 |
| 6,954,204 | B2 | * | 10/2005 | Zatz et al. | 345/522 |
| 2002/0133797 | A1 | * | 9/2002 | Sasagawa et al. | 716/9 |
| 2002/0180741 | A1 | * | 12/2002 | Fowler et al. | 345/520 |

OTHER PUBLICATIONS

Eric Chan, Ren Ng, Pradeep Sen, Kekoa Proudfoot, Pat Hanrahan Sep. 2002 HWWS '02: Proceedings of the ACM SIGGRAPH/Eurographics conference on Graphics hardware.*
Macedonia, Michael "The GPU Enters Computing's Mainstream" Computer, vol. 36, Issue 10 Oct. 2003 pp. 106-108 ISSN: 0018-9162.*
Peercy, et al. "Interactive Multi-Pass Programmable Shading" SIGGRAPH 2000, New Orleans, LA, USA ACM 2000.*
Breternitz, Jr., et al. "Compilation, Architectural Support and Evaluation of SIMD Graphics Pipeline Programs on a General Purpose CPU" Proceedings of the 12th International Conference on Parallel Architectures and Compilation Techniques PACT '03 IEEE Computer Society 2003.*

(Continued)

*Primary Examiner*—Kee M Tung
*Assistant Examiner*—Daniel Washburn
(74) *Attorney, Agent, or Firm*—Lyon & Harr, L.L.P.; Craig S. Fischer

(57) ABSTRACT

A system and method for optimizing the performance of a graphics processing unit (GPU) for processing and execution of general matrix operations such that the operations are accelerated and optimized. The system and method describes the layouts of operands and results in graphics memory, as well as partitioning the processes into a sequence of passes through a macro step. Specifically, operands are placed in memory in a pattern, results are written into memory in a pattern appropriate for use as operands in a later pass, data sets are partitioned to insure that each pass fits into fixed sized memory, and the execution model incorporates generally reusable macro steps for use in multiple passes. These features enable greater efficiency and speed in processing and executing general matrix operations.

15 Claims, 15 Drawing Sheets

OTHER PUBLICATIONS

Lefohn, et al. "A GPU-Based, Three-Dimensional Level Set Solver with Curvature Flow" University of Utah, School of Computing Technical Report UUCS-02-017 Dec. 11, 2002.*

Thompson, et al "Using Modern Graphics Architectures for General Purpose Computing: A Framework and Analysis" IEEE 2002.*

Bohn, Christian A. "Kohonen Feature Mapping through Graphics Hardware" Association for Intelligent Machinery, Inc, Proc. JCIS'98 pp. 64-67, 1998.*

Bolz, J., Farmer, I., Grinspun, E., and Schröoder, P., "Sparse matrix solvers on the GPU: conjugate gradients and multigrid", *ACM Transactions on Graphics (TOG)*, v.22 n.3, pp. 917-924, Jul. 2003.

Hillesland, K. E., Molinov, S., and Grzeszczuk, R., "Nonlinear Optimization Framework for Image-Based Modeling on Programmable Graphics Hardware", in *ACM Transactions on Graphics*, pp. 925-934, (2003).

Kirmse, Andrew, "Artificial Neural Networks on Programmable Graphics Hardware" in *Game Programming Gems 4*, published by Charles River Media, pp. 373-377, Mar. 2004 (also see http://www.charlesriver.com/titles/gamegems4.html).

Kruger, J. and Westermann, R., "Linear Algebra Operators for GPU Implementation of Numerical Algorithms", *ACM Transactions on Graphics 22*, Jul. 3, pp. 908-916, (Proceedings of ACM SIGGRAPH 2003).

Larsen, S.E. and McAllister, D., "Fast matrix multiplies using graphics hardware", in *Proc. of the 2001 ACM/IEEE conference on Supercomputing* (CDROM), p. 55-55, Nov. 10-16, 2001, Denver, Colorado.

Lefohn, A. and Whitaker, R., "A gpu-based, three-dimensional level set solver with curvature flow", *Technical report*, University of Utah, Dec. 2002.

Purcell, T.J., Buck, I., Mark, W.R., and Hanrahan, P., "Ray tracing on programmable graphics hardware", in *Proc. of SIGGRAPH*, pp. 703-712, (2002).

Venkatasubramanian, S., "The Graphics Card as a Stream Computer", AT&T Research Labs, 2003.

Co-pending U.S. Appl. No. 10/837,382, "System and Method for Accelerating and Optimizing the Processing of Machine Learning Techniques Using a Graphics Processing Unit", filed Apr. 30, 2004.

* cited by examiner

MUL R0, V.XXXX, M1;
MAD R0, V.YYYY, M2, R0;
MAD R0, V.ZZZZ, M3, R0
MAD R0, V.WWWW, M4, R0;

DP4, R0.X, V, M1;
DP4, R0.Y, V, M2;
DP4, R0.Z, V, M3;
DP4, R0.W, V, M4;

INPUTS (IMAGE)   HIDDENS   OUTPUTS (CHARACTER LIKELIHOOD)

OPTIMIZING PERFORMANCE OF A GRAPHICS PROCESSING UNIT FOR EFFICIENT EXECUTION OF GENERAL MATRIX OPERATIONS

CROSS REFERENCE TO RELATED APPLICATIONS

The application claims the benefit of a previously-filed provisional patent application having Ser. No. 60/528,400 filed on Dec. 9, 2003.

TECHNICAL FIELD

The present invention relates in general to computer processing and more particularly to a system and method for optimizing performance of a graphics processing unit (GPU) for processing and execution of general matrix operations such that the operations are accelerated and optimized.

BACKGROUND OF THE INVENTION

A graphics processing unit (GPU) is a standard element of the modern desktop personal computer (PC). Initially a feature of high-end graphics workstations, the GPU has found its way onto the PC bus as an accelerator of graphics functions for which a conventional central processing unit (CPU) was ill suited or simply too slow. Presently, the GPU is a prominent component of the PC with its own dedicated path to main CPU memory as well as its own dedicated graphics memory.

Interactive computer graphics began as line drawings on calligraphic displays, which were basically modified oscilloscopes. The computation for these early displays required vector operations including general geometric transformations, clipping to boundaries of the display devices, and perspective transformations for three-dimensional (3D) displays. The advent of inexpensive commodity semiconductor memory prompted the replacement of these line drawing systems by raster graphics processors, which refreshed television-like displays through a frame buffer memory.

Because the raster graphics systems could display shaded solid surfaces, which is generally preferable to line drawing for a wide range of applications, the raster graphics processor quickly displaced line drawings. Instead of straight line segments, the geometric primitives for these raster graphics systems were polyhedral surfaces constructed from an array of triangles. The display primitives were a rectangular array of pixels stored in the frame buffer memory. Rows of the array correspond to the discrete scan lines on the raster scan cathode ray tube (CRT).

The process of turning triangles into pixels is called "rasterization" and represents an additional step in the display pipeline. The geometric processing steps prior to rasterization are the same as those in the line drawing pipeline and are retained in the raster graphics display pipeline. A major addition to the raster graphics display pipeline is texture mapping, which is the ability to query rectangular images in arbitrary order to fetch color detail that can be applied to a solid surface as a decal. Over the years this process has been generalized to include mapping of almost any property, not just color, to a rasterized surface at a per-pixel rate. Although the features of the texture-mapped rendering pipeline have become richer, it still lacks the flexibility to match the visual realism produced by the per-pixel shading calculations seen in software rendering systems.

One solution to this problem is to build hardware with the flexibility to "inline" code for the rendering of a surface. The hardware still takes triangles as input, but also allows the instructions to compute each pixel as specified by a program, which can be loaded before the triangle(s) is (are) rendered. These programmable elements are called "pixel shaders." Alternatively, pixel shaders are often called "fragment shaders." The two terms are used interchangeably in this document. The instructions of the program in the shaders are close to assembly language since they each have a direct hardware implementation. There are competing languages (and hardware) for shaders, such as High Level Shader Language (HLSL), C graphics (Cg) from NVIDIA, as well as DirectX assembly code.

Co-processors are not a new feature of personal computers. The integral floating point co-processor shares the host CPU's instruction stream and has access to CPU memory. Additional integrated co-processors include CPU extensions such as multimedia extensions (MMX) or streaming SIMD extensions (SSE), which have parallel data paths, asynchronous execution, and also access to the CPU memory. GPUs, on the other hand are autonomous special purpose processors with their own instruction streams, datapaths, and dedicated memory. Trends in GPU design and configuration have given them larger dedicated memory, higher, bandwidth to graphics memory, increased internal parallelism, and increased degrees of programmability.

The memory directly available to a GPU is large but finite. Furthermore, programmability of GPUs remains limited both by the small number of instructions that can fit into a GPU computing element and by the special-purpose nature of the arithmetic units. The programmability limitation forces programmers to break operations into smaller parts, which are executed in sequence. Intermediate results are stored in main memory. The finite size of graphics memory means that the efficient layout of intermediate results in memory is of critical importance to the programmer. Further complicating data layout is the peculiarity of the special purpose graphics datapaths, which means that clever data layout affects the efficiency of execution as well as the programmer's ability to fit the results into graphics memory. Therefore, what is needed is a system and method for optimizing performance of a GPU that enables operations to be executed by the GPU for more efficient processing than is available using a CPU. Moreover, what is needed is a system and method for optimizing performance of a GPU that provides an efficient layout of data in memory in order to make maximum use of the memory and provide efficient execution by the GPU.

SUMMARY OF THE INVENTION

The invention disclosed herein relates to a system and method for optimizing performance of a graphics processing unit (GPU) to execute general matrix operations. GPUs were originally designed to accelerate the display of real-time 3D graphics. However, the parallelism and high-memory bandwidth in GPUs has provided dramatic performance improvements for many other types of applications as well. The system and method disclosed herein seek to exploit the parallelism and high-memory bandwidth of GPUs in ways that have little to do with the original purpose of accelerating graphics processing. More specifically, the system and method exploit the high-memory bandwidth and internal parallelism of the GPU to increase processing efficiency and speed. In addition, the specialized architecture of the GPU is accommodated, taken into consideration, and leveraged to provide even greater efficiency and speed. In order to do achieve this leveraging across a wide range of applications, not just the three-dimensional (3D) rendering function for which the processor was designed, the system and method provide a method and system of optimizing processing using the GPU.

The system and method take full advantage of the new flexibility introduced by programmable pixel shaders of GPUs. These programmable pixel shades allow not only naturalistic rendering of surfaces, but also brings the GPU closer to a general purpose parallel processor. The system and method disclosed herein exploit the pixel shaders and parallel architecture of the GPU. In particular, pixel shaders are used to implement the various primitive operations used in machine learning algorithms and other non-graphics applications. As a result of the parallel specialized GPU hardware, the training and use of these algorithms run an order of magnitude faster on GPU than on CPU.

Applications that incorporate repeated operations on large floating point matrices and vectors greatly benefit from the migration of those operations to a GPU. The GPU optimization system and method described herein improve on prior approaches for migrating non-graphics applications to GPUs by providing a system and method of optimizing performance of a GPU for efficient execution of general matrix operations. In addition, the GPU optimization system and method may include a GPU abstraction. As known in the art, an abstraction is the use of specialized software as a means of shielding software from device dependencies. The system and method describes the layouts of operands and results in graphics memory, as well as partitioning the processes into a sequence of passes through a macro step. Specifically, operands first are placed in memory in a pattern by which normal 2D texture mapped address interpolation will deliver inputs to the GPU fragment shader without indirection. Next, results are written into memory in a pattern appropriate for use as operands in a later pass. Data sets then are partitioned to insure that each pass fits into fixed sized memory. Finally, the execution model incorporates generally reusable macro steps as atomic operations for use in multiple passes. The unique memory layout along with the partitioning of large processes into smaller kernels enable greater efficiency and speed in processing and executing general matrix operations.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Graphics processing units (GPUs) have traditionally been used to accelerate real time 3D graphics displays. As a result of increased processing power and programmability, however, GPUs are also capable of efficiently processing other non-graphics related processes. These processes typically have been limited to alternative graphics algorithms and scientific computing problems involving large amounts of data and processing (such as computational fluid dynamics). General matrix operations, however, have attracted relatively little interest due to the limitations and characteristics of the GPU architecture.

The GPU optimization system and method described herein alleviates the computational limitations of CPUs by porting some or all of the CPU processing to the GPU. More specifically, the system and method enables performance optimization for the GPU for to efficiently execute general matrix operations. This performance optimization of the GPU is accomplished using several novel techniques that overcome the limitations and work well within the framework of the GPU architecture. With these limitations overcome, general matrix operations are particularly well-suited for processing on the GPU because the GPU is typically much more powerful than the typical CPU.

In particular, the GPU optimization system and method optimizes the performance of a GPU for matrix operations and associated applications. The GPU optimization system and method achieve this in at least two ways. First, the GPU optimization system and method cascades a series of computing passes over operands and temporary results. Second, the GPU optimization system and method iterates over various combinations of computing passes to achieve a particular combination that globally optimizes GPU performance.

II. Exemplary Operating Environment

The GPU optimization system and method disclosed herein are designed to operate in a computing environment. The following discussion is intended to provide a brief, general description of a suitable computing environment in which the GPU optimization system and method may be implemented.

Figure 1:
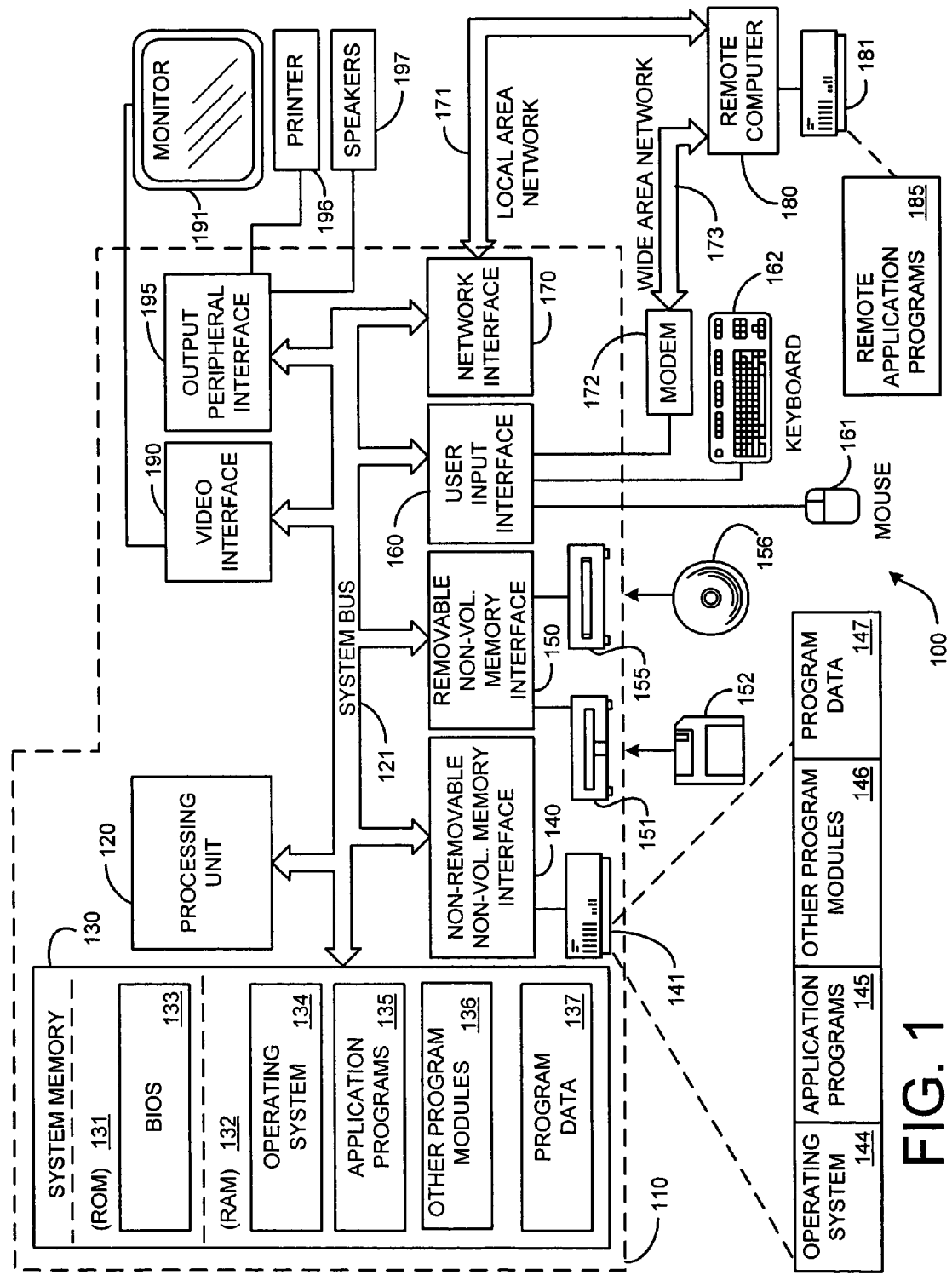
FIG. 1 illustrates an example of a suitable computing system environment in which the GPU optimization system and method may be implemented.

FIG. 1 illustrates an example of a suitable computing system environment in which the GPU optimization system and method may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The GPU optimization system and method is operational with numerous other general purpose or special purpose computing system environments or configurations. Examples of well known computing systems, environments, and/or configurations that may be suitable for use with the GPU optimization system and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The GPU optimization system and method may be described in the general context of computer-executable instructions, such as program modules, being executed by a computer. Generally, program modules include routines, programs, objects, components, data structures, etc., that perform particular tasks or implement particular abstract data types. The GPU optimization system and method may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the GPU optimization system and method includes a general-purpose computing device in the form of a computer 110.

Components of the computer 110 may include, but are not limited to, a processing unit 120 (such as a central processing unit, CPU), a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within the computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 120 through a user input interface 160 that is coupled to the system bus 121, but may be connected by other interface and bus structures, such as, for example, a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

III. General Overview

Graphic processing units (GPUs) are designed to accelerate real-time 3D graphics display. As demand for better graphics increases, GPUs are quickly becoming more powerful and programmable. As a result of their increased programmability, GPUs are also capable of efficiently processing many other type of non-graphics related processes. The GPU optimization system and method disclosed herein alleviates the computational constraints of CPUs by porting some of the CPU processing to the GPU. More specifically, the present invention achieves performance optimization of the GPU to allow processing and execution by operations traditionally handled by the CPU to the GPU. As explained in detail below, this requires the use of several implementation techniques to overcome the several limitations of the GPU and to accelerate and optimize GPU processing.

Figure 2:
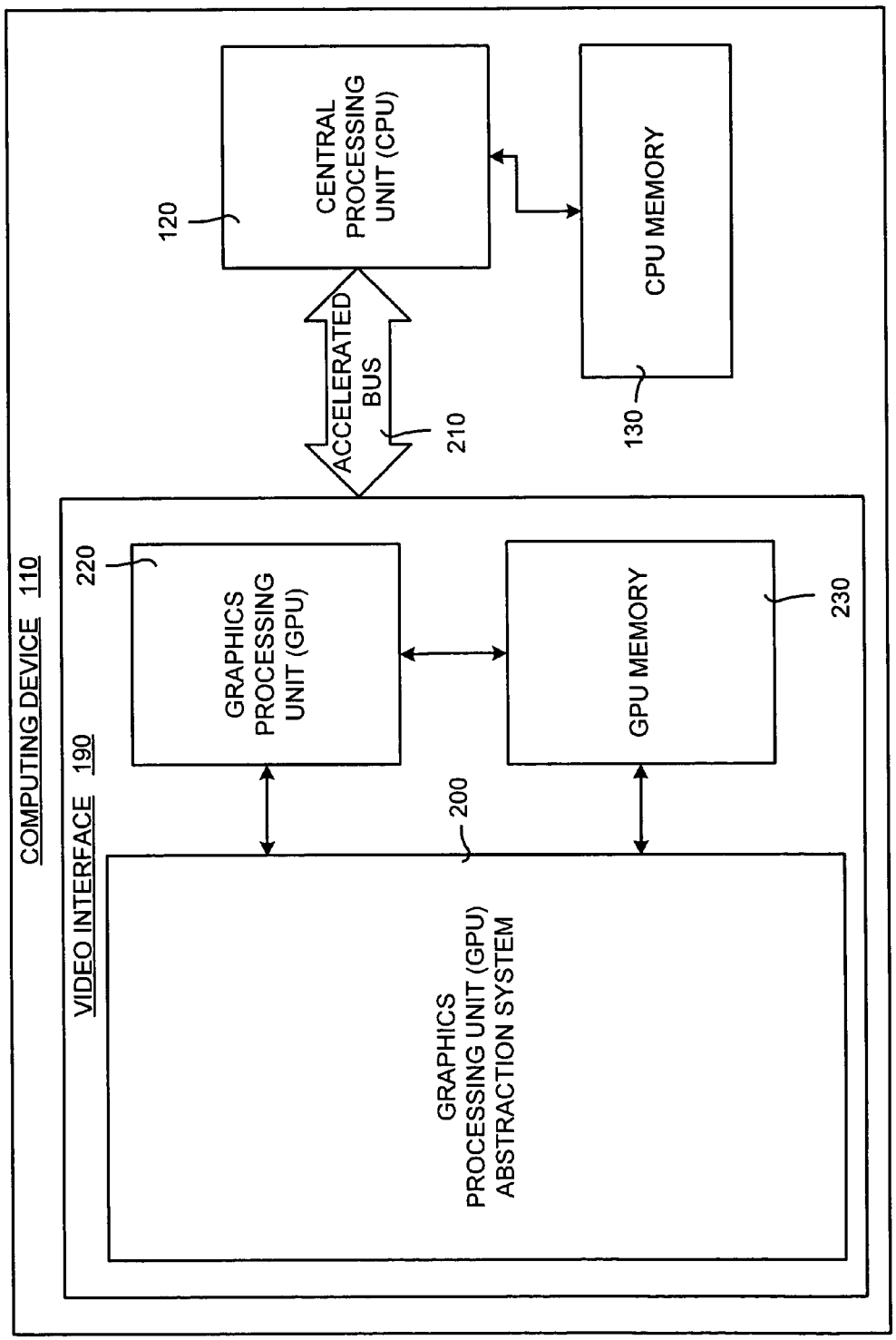
FIG. 2 is a block diagram illustrating an exemplary implementation of the GPU optimization system and method disclosed herein.

FIG. 2 is a block diagram illustrating an exemplary implementation of the GPU optimization system and method disclosed herein. It should be noted that FIG. 2 is merely one of several ways in which the GPU optimization system and method may implemented and used. General matrix operations can be processed quickly and efficiently by the GPU using the system and method described herein. Moreover, the processing performed by the GPU optimization system and method system may be used for machine learning applications requiring training and testing (or use) phases. The training phase may be performed on the GPU, the testing phase may be performed on the GPU, or both. For instance, in machine learning applications where training takes an extended period of time, but maximum hardware independence is desired, the training will be done on the GPU, but testing will be done on the CPU. It is also possible for a training algorithm to be too complex to run on the GPU, while the testing algorithm is simpler (such as a trainable convolution layer in a neural network). In this case, it is possible to train the learning algorithm on the CPU, but use the GPU during the test phase. Of course in some cases, it may be desirable to run both training and testing on the GPU. A GPU implementation increases the machine learning processing, both for training and testing, by up to an order of magnitude over CPU-only implementations.

As shown in FIG. 2, the computing device 110 contains a GPU optimization system 200. The computing device further contains the CPU 120 and the CPU memory 130. The CPU is in communication with the video interface 190 through an accelerated bus 210. Preferably, this bus 210 is an Accelerated Graphics Port (AGP), which is designed especially for the throughput demand of 3D graphics.

The video interface 190 includes a GPU 220 and a GPU memory 230. The GPU 220 is capable of transferring data to the CPU 120 over the bus 210. The GPU optimization system 200 is also in communication with the GPU 220 and the GPU memory 230. Results of the processing by the GPU optimization system and method 200 are transferred from the GPU optimization system 200 to the CPU 120 for use in interactive use applications, such as speech recognition.

IV. Graphics Processing Unit Optimization System

Figure 3:
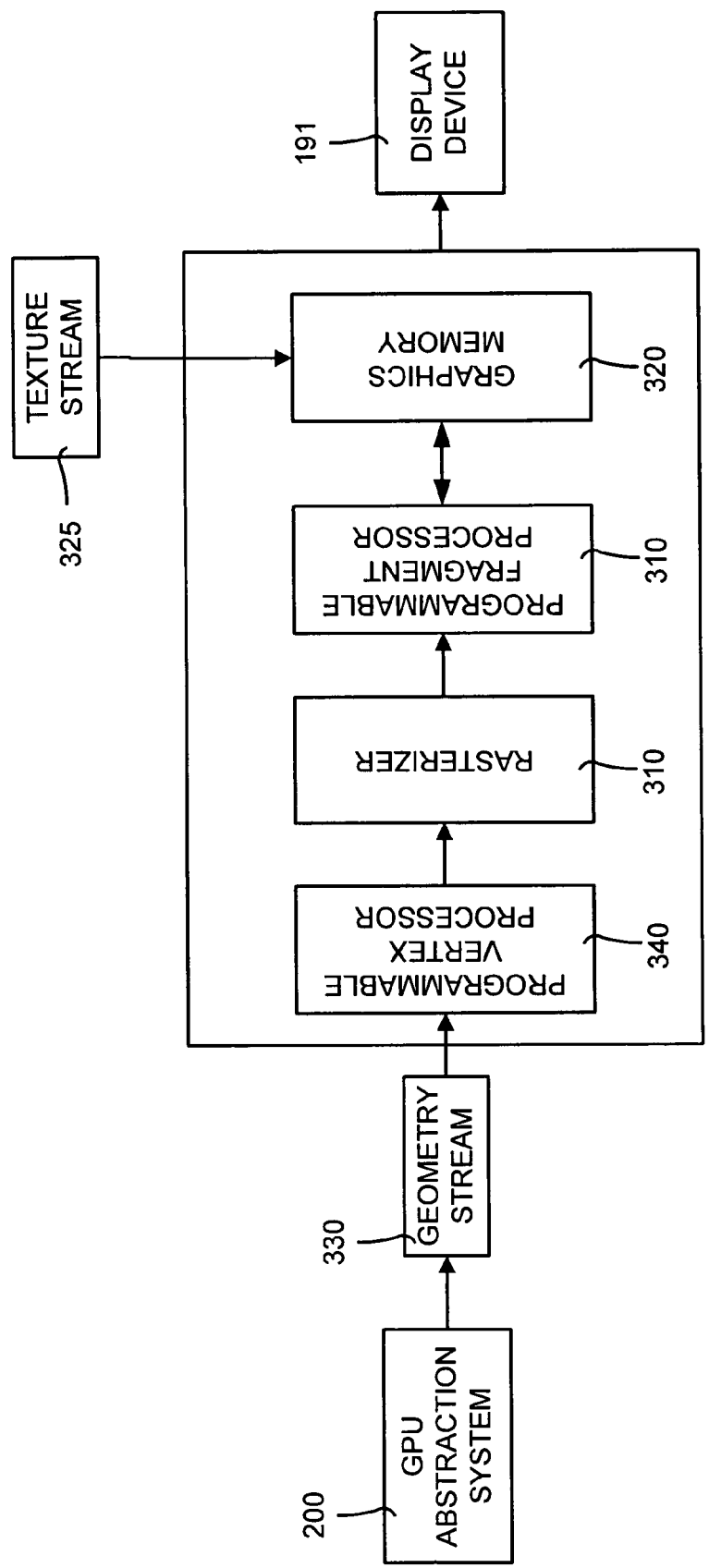
FIG. 3 is a block diagram illustrating the interaction between the GPU and GPU optimization system shown in FIG. 2.

The GPU 220 is a complex single-chip processor, containing well over 100 million transistors. Its components are grouped into the functional units outlined in the block diagram of FIG. 3. FIG. 3 is a block diagram illustrating the interaction between the GPU and GPU system shown in FIG. 2. For general purpose computation, a programmable fragment processor (or shader) 310 and a dedicated graphics memory 320 are used. The programmable fragment processor 310 may include a single instruction/multiple data (SIMD) processor array that provides parallel processing such that many processing elements perform the same operations on different data. A texture stream from the GPU optimization system 200 is received by the graphics memory 320. In a preferred embodiment, the graphics memory includes approximately 100 megabytes or more of (DRAM)

A geometry stream 330 from the GPU optimization system 200 consists of a single polygon per processing pass. A programmable vertex processor 340 is idle except for passing this single polygon. A rasterizer 350 operates on this single polygon to effect a "do loop" for the programmable fragment processor 310. Output from the interaction of the GPU optimization system 200 and the GPU 220 is displayed on the display device 191.

GPU As Execution Engine

The fundamental operation of a graphics processing unit is interpolation. At its core, the processor rasterizes triangles, or, in other words, it interpolates a collection of variables over the area of the target rectangle enclosed within the 3D-to-2D projection of the triangle. The target rectangle typically corresponds to the viewing screen, but that is not always the case. Thus, a programmer has flexibility to specify any rectangular domain as the target. If the projected triangle vertices fall outside the target rectangle, the graphics processing unit automatically trims the triangle to fit the target area. This is known as "clipping."

Figure 4:
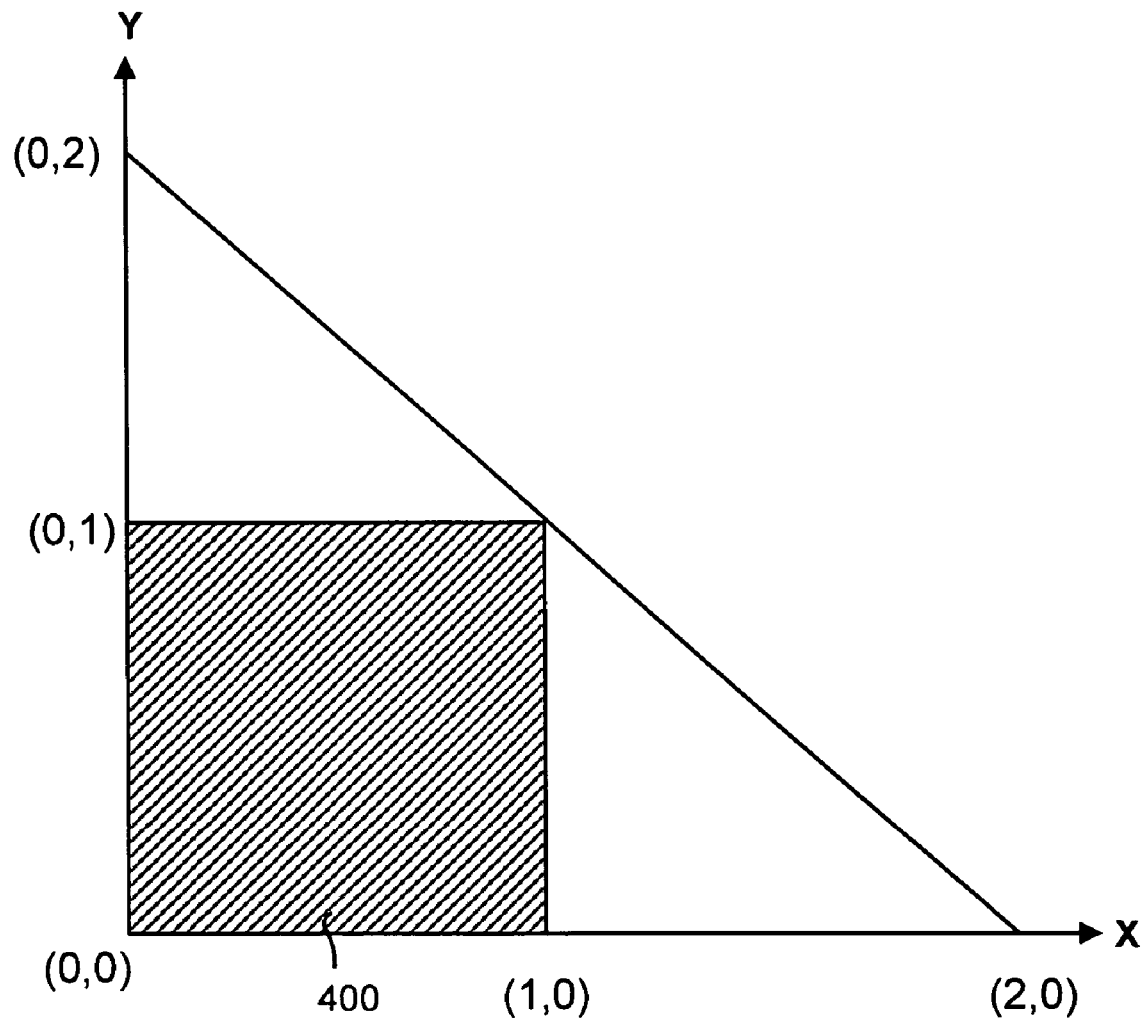
FIG. 4 is an illustration of an implementation of an interpolation pass by clipping and rasterizing a single triangle.

Execution typically is partitioned into a number of passes whereby each pass interpolates a set of functions over a rectangular domain (or viewport rectangle) 400. In the graphics terms described above, this interpolation pass is implemented by clipping and rasterizing a single triangle, as illustrated in FIG. 4. FIG. 4 is an illustration of an implementation of an interpolation pass by clipping and rasterizing a single triangle. In general, this clipping and rasterizing of the single triangle obtains the peak rasterization rate capable by the GPU.

In situations where a vector needs to be rendered instead of a matrix, the same technique also is used. Namely, the viewport rectangle 400 is specified that is only one pixel tall. To render a scalar value, a one-by-one-pixel viewport can be used.

A second feature of GPUs is texture mapping. For this texture mapping, indices into a rectangular lookup table are bi-linearly interpolated across the target area of a rasterized triangle. In the example triangle shown in FIG. 4, if the indices at the origin are [0,0], the indices at the vertex on the Y axis are [0,2], on the X axis are [2,0], then the interpolated range over the target rectangle 400 goes from [0,0] to [1,1]. For each interpolated point in the target 400 multiple textures (look up tables) may be accessed, each with their own set of indices. A one-dimensional (1D) look up table is simply a degenerate rectangle. There are other methods to full a rectangular region with interpolated values, such as rendering two triangles in the shape of a quad. Experimentally, it has been found that rasterizing a single clipped triangle yields the best fill rate performance.

Figure 5:
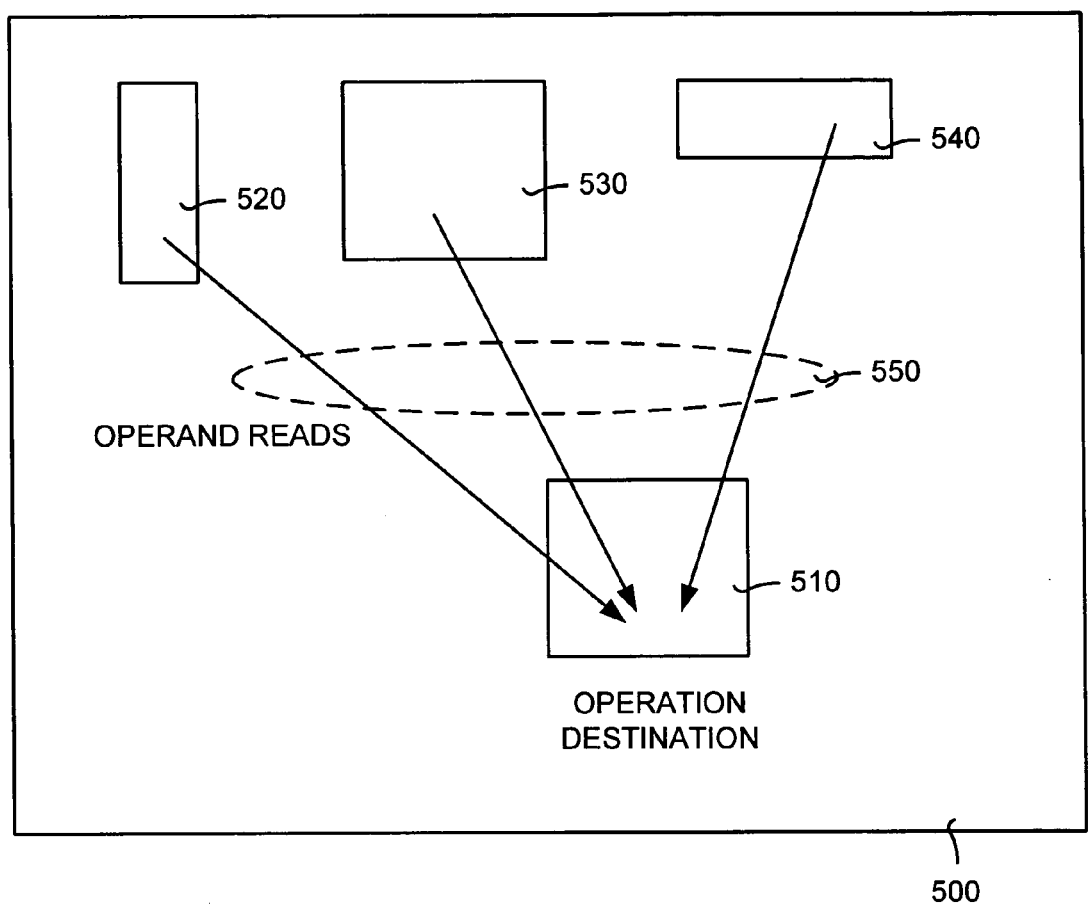
FIG. 5 illustrates a GPU memory organization for scalars of the GPU optimization system and method.
Figure 6:
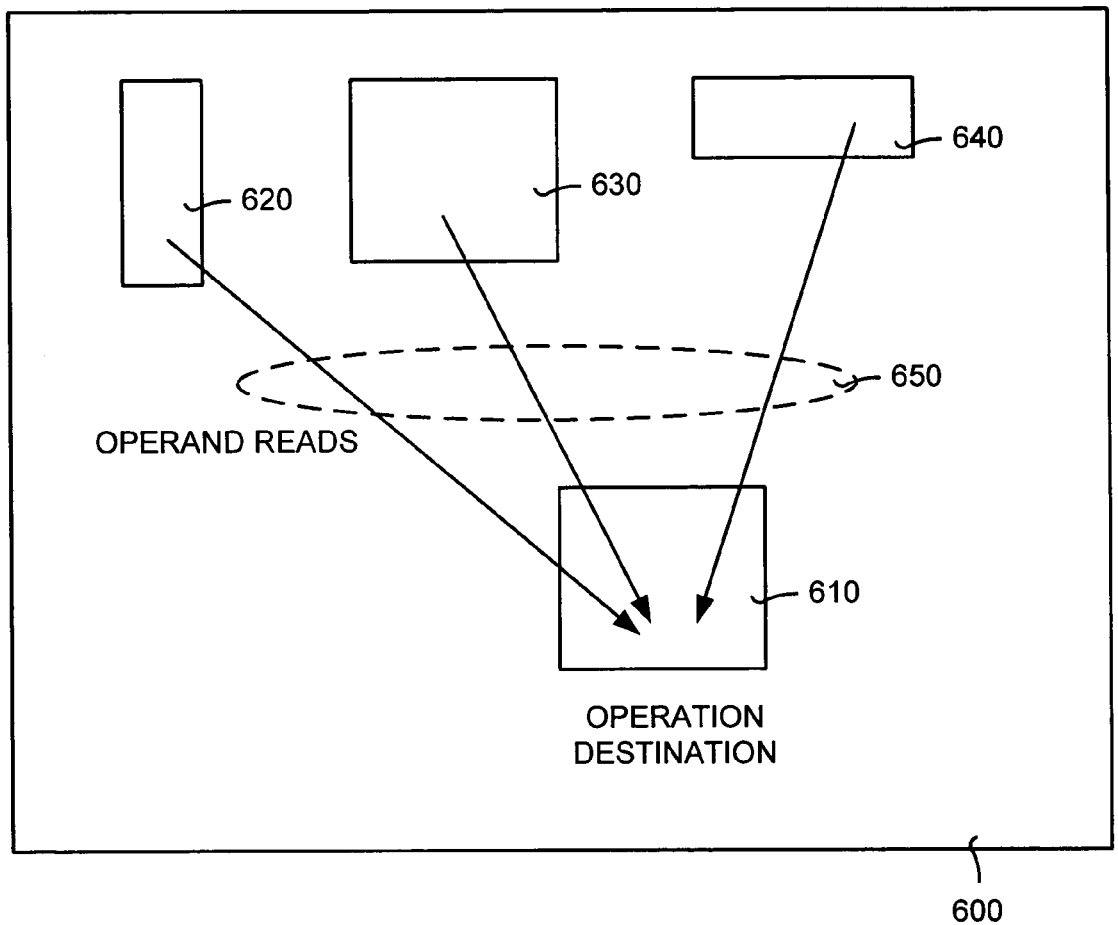
FIG. 6 illustrates a GPU memory organization for vectors of the GPU optimization system and method.

The texture mapping hardware then serves as the address generator for input operands. A third feature of GPUs, the programmable fragment shader 310 shown in FIG. 3, permits functions of these operands to be written into the target rectangle 400. FIG. 5 illustrates a GPU memory organization for scalars of the GPU optimization system and method. FIG. 6 illustrates a GPU memory organization for vectors of the GPU optimization system and method. FIGS. 5 and 6 are discussed in detail below.

For graphics rendering, fragment shaders are intended to compute shading functions that model the appearance of synthetic surfaces at each point on the surface. Fragment shaders operate on the individual red, green, blue, and alpha components of surface color in parallel to produce the desired appearance. Since the shaders are used to render pixels for animated displays in real time, only a limited size of instruction memory is provided. For non-graphics applications fragment shaders provide 4-way SIMD execution of a user defined function. Additional parallelism comes from replication of the fragment shader processors, but in current implementations this parallelism is not visible to the programmer.

The limited amount of instruction memory is a major factor that leads to the dividing up of complex functions into multiple passes that would normally be represented as a single data parallel operation contained in a single pass. In addition, the need to step through memory in a different direction may require the need to break up execution of a single function into two passes even when the limits of instruction memory are not exceeded.

General Purpose Execution on the GPU

While the specialized architecture of the GPU is something of a curse, it is also a blessing—addressing is something that becomes implicit in the execution.

For general usefulness, it is convenient to provide an abstraction of the GPU as a general execution mechanism. Using rasterization as the looping mechanism and the general-purpose programming facilities available within pixel shaders, unary operations like x=F(x) can be implemented for vectors and arrays. For operations that need to read from other operands, GPU memory organization needs to be understood. FIGS. 5 and 6 illustrate a workspace containing all operands as well as a destination for computation. On current hardware, this workspace is a 2K×2K array of 4-vectors in which each vector component is a float.

Referring to FIGS. 5 and 6 and using the terminology of graphics applications, three operands, $t_1$ 520, 620, $t_2$ 530, 630, and $t_3$ 540, 640, are texture maps. An operation destination d 510, 610 is a rendered image, and the function that operates on the three operands is called a shader. For general purpose applications, this terminology is shed and different model is adopted.

This model differs from convention stream processing in that the inputs are sequential addresses. In other words, texture map indices, rather than input stream data. Typically, operands are fetched using highly structured reads from locations within the workspace, though the kernel is free to perform its own address calculation or use the sequential values directly in the computation. Output to the destination, on the other hand, fits the stream model very well. The output of the kernel is sequential data values that are written to the workspace. The writes are only sequential as per traditional stream computing.

Functions operating on the inputs are expressed as sequences of instructions executed by a SIMD processor (such as the programmable fragment processor 310). A complete program is broken into successive passes of these functions over the data. Each pass represents a single data parallel operation in the program. The algorithm may be divided up into further passes due to the limitations present in existing GPU architectures. These include limited instruction length, temporary storage available, and limited number of outputs permitted by the fragment program. As the program is broken into a sequence of passes, the output of the previous pass becomes the input of following pass. There are many reasons the invention disclosed herein uses passes. These reasons include: it is not just length but also limited outputs (a single 4-vector) and limited internal temporary storage (only 12-16 registers, no temporary stack or heap memory.

Note that following sections refer to GPU instructions using the notation of DirectX assembly language and may discuss programming conventions in terms of DirectX features. This is simply a matter of convenience and in no way limits the techniques to DirectX implementations.

Primitive Operations on the GPU

Fortunately, many machine learning techniques, such as neural networks, expectation minimization, and many other gradient descent based algorithms are composed of simple primitives (or building blocks). These primitives include:
 Inner products (between vectors or matrix and vector)
 Outer products (between vectors)
 Linear algebra (such as addition, subtraction, multiplication by a scalar on vectors or matrices)

Non-linearity (such as tanh, sigmoid, thresholding) applied to a vector or a matrix Matrix transpose The GPU optimization system and method implements each of these operations using pixel shaders. In addition, the method allows each of these operations to be used together for both training and use in a real setting. It should be noted that the method can be used with neural networks or any other learning algorithms made out of the same primitives as described below, or simple extensions thereof.

Using Pixel Shaders for GPU Computations

Each of the operations listed above can be implemented using one or more pixel shaders. The GPU optimization system and method uses the GPU as a general purpose parallel processor. In addition, the method uses pixel shaders to implement the various primitive operations used in machine learning techniques. As a result of the parallel specialized GPU hardware, the training and use of these algorithms run an order of magnitude faster on a GPU than on a CPU.

In the Direct3D component of DirectX, there are two elements, called vertex shaders and pixel shaders. DirectX is a set of application program interfaces (APIs) developed by Microsoft® Corporation that lets applications take advantage of hardware acceleration features of the GPU. The current generation of pixel shaders are highly programmable. Both types of shaders are concerned with the rendering of triangles (the building blocks of graphics objects) to an output device. Vertex shaders can be used for tasks like spatial transformation and animation of the vertices of triangles (hence the name). Pixel shaders are used to shade (or calculate the color values of) the individual pixels as a single triangle is rasterized.

A pixel shader is expressed as a series of instructions in DirectX shader assembly language, which is a limited, hardware-independent language defined by DirectX. The code in a shader is executed once for each pixel in a triangle being rendered, and its only effect is to set the values of the 4-vector for that pixel. The limitations of the shader language, and the lack of side effects, mean that the GPU is free to render pixels in any order and using as much parallelism as its hardware can support, resulting in very high performance. The fact that a pixel is a 4-vector affords yet another kind of parallelism; each execution of a pixel shader can calculate four elements (e.g. four adjacent elements of a vector) simultaneously.

Many of the facilities used in assembly language programming can be used within pixel shaders. These includes constants, registers, addition, subtraction, multiplication, reciprocal, a small set of transcendental functions, and so on. However, other familiar constructs such as looping and branching are not generally available. This is because the number of instructions per shader is restricted (96 instructions in one popular GPU) and because a shader cannot modify memory other than the pixel being rendered. These limitations mean that some algorithms are ill-suited for processing by the GPU and, if they can be implemented at all, will run slower on the GPU than the CPU. To evaluate whether a particular machine learning algorithm can be executed on a GPU, each of the individual operations that make up the algorithm need to be examined.

Addressing

Addressing of operands and destination data is highly structured and a prime task for the programmer is to work within this limitation. In particular, GPUs reference the working set with 2D addresses. If a destination rectangle of size a by b pixels is being rendered, another region can be texture-mapped that is also a by b pixels. This gives direct access, within the shader code, to the source-rectangle values at $a_i$ and $b_i$ that correspond to the ith pixel in the destination. A simple application of this technique allows any matrix, vector or scalar value to be copied to a same-sized matrix, vector or scalar elsewhere in the workspace. Alternatively, a texture region of x pixels by 1 pixel could be mapped to our destination rectangle. This would give access to a lookup table whose value depends on the x coordinate, but not the y coordinate, of the destination pixel being rendered.

Figure 7:
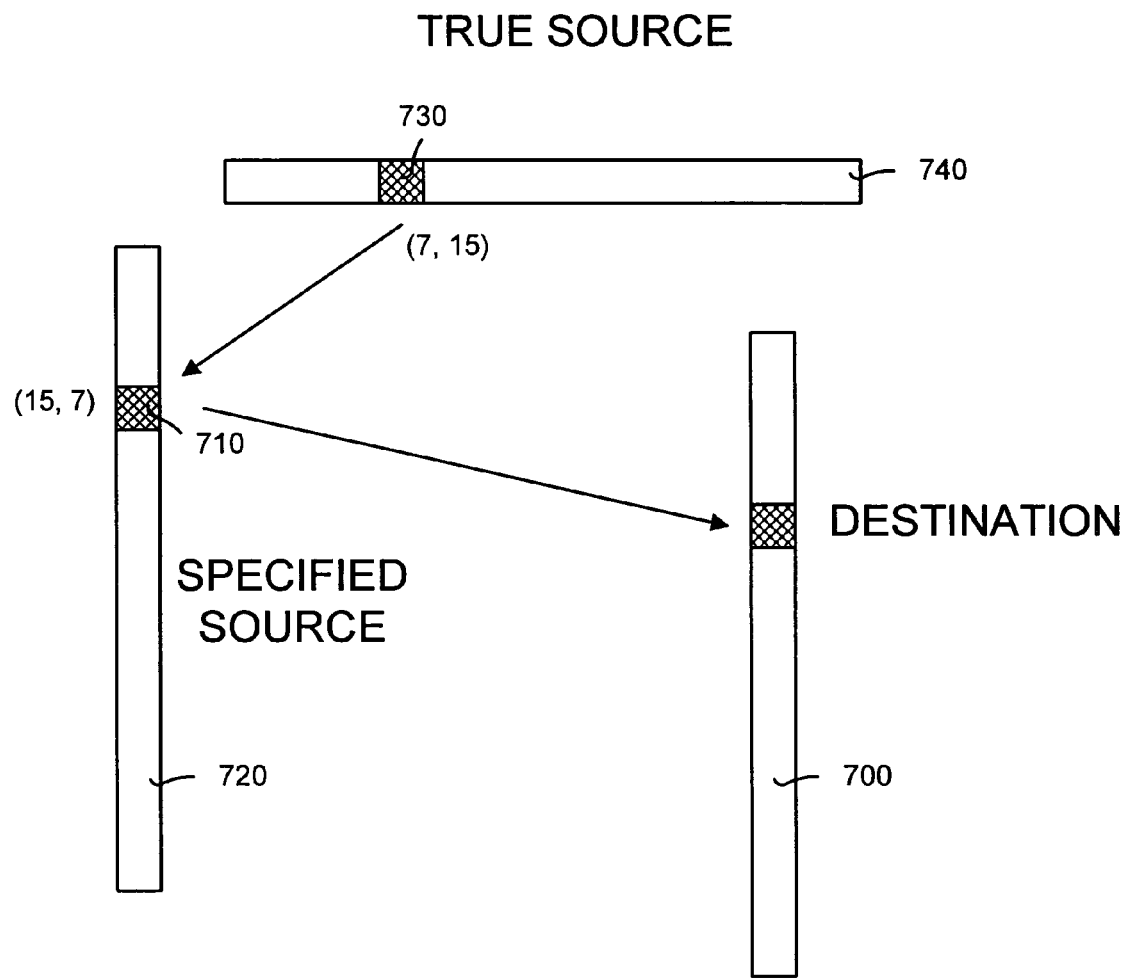
FIG. 7 illustrates a mechanism for transposing an array, such as during reordering.

The usefulness of textures can be extended by using arithmetic on register values inside a shader. Registers are local variables that the shader can use to render a given pixel. Their values cannot be shared between pixels (this would break the parallelism assumption) but can be used (locally) for intermediate results. By way of example, any array or vector can be transposed while copying its values to a new location. Suppose there is a source rectangle whose left, right, top, and bottom coordinates are l, r, t, and b. A texture rectangle could be specified whose coordinates are t, b, l, and r. Then, inside the pixel shader, the x and y texture coordinates are swapped before using them to fetch a value from the source and copy it to the destination. At the end of rendering, the destination will contain the transpose of the source. FIG. 7 illustrates a mechanism for transposing an array, such as during reordering. In FIG. 7, the rendering of the current pixel of a destination 700 will retrieve texture coordinates (15, 7) from a texture rectangle 710 in a specified source vector 720. However, before fetching the texture value, the row and column coordinates are reversed so that the value from a texture rectangle 730 having location (7, 15) is actually read, which is located inside the actual vector 740 being transposed.

DirectX allows texture mapping to be used to map more than one source rectangle to the current destination. At least 8 such mappings can be used in each pass in current hardware. With multiple sources, operations such as (vector A−vector B→vector C) can be implemented. At each pixel in C, the texture-mapped values from A and B are fetched, elementary math on register values is performed, and the results is stored.

Texture-mapping from two vectors to a matrix also gives a way to implement an outer product (vector A×vector B→matrix C). Let vector A be a row vector, one pixel wide, and B a column vector, one row tall. These degenerate rectangles can be texture-mapped to the rectangle of matrix C. Then, when rendering the pixel x,y of C, the texture sampling will give the $Y_{th}$ element of A and the $x_{th}$ element of B, which are just the values needed to multiply and store.

Pixel Single Instruction/Multiple Data (SIMD)

At this point, before the implementation of the inner product (matrix A×vector B→vector C) is discussed, unit operations will be examined in light of the fact that the GPU workspace has 4 components, with each pixel consists of x, y, z, and w values. The labels x and y here should not be confused with x and y in reference to pixel coordinates in the discussion above. For the invention disclosed herein, it makes no difference that the 4 components are conventionally used to store RGBA color values or coordinates in 4-dimensional object space. They are just part of the GPU programming model and hardware that are exploited to perform computation faster. It would be possible to ignore three of the components and do all of the calculations in, say, the x component, but the resulting simplification of programming would come at a high performance cost.

First, the mapping of the pixel components to locations in mathematical arrays or vectors must be defined. For vectors, the simplest mapping is as follows:

pixel 0:x→element 0
pixel 0:y→element 1
pixel 0:z→element 2
pixel 0:w→element 3
pixel 1:x→element 4
and so forth.

To extend this to matrices, it is observed that each row (or column) of a matrix is a vector, the mapping above is applied to each row (or column). Whether the four components are "collapsed" into the row dimension or the column dimension is a choice that will be made individually for each matrix depending on the resulting program efficiency.

Given this mapping from matrix or vector elements to pixels and components, it should be clear that copy operations are not affected at all by this mapping. The shader instructions texld and mov, like many others, operate on a pixel at a time, so they respectively move four values from a texture pixel to a register and from a register to the destination pixel.

Transpose operations on vectors are also unchanged. The components are always collapsed into the dimension of the vector. In the case of matrices, the code does not change, but a note must be made that the direction of collapse is transposed along with the data.

Mathematical operations can be adapted. Many shader instructions can be used either on a 4-vector of values or on a single value, with appropriate syntax. For example, exp r1.x, r0.x fetches the x component of register 0, exponentiates it, and stores the result into the x component of r1.

V. Operational Overview

The GPU optimization system 200 disclosed herein uses the GPU optimization method for GPU processing and execution of general matrix operations such that the operations are accelerated and optimized.

Abstracting of the Graphics Processing Unit (GPU)

Computation Model

Programming a general purpose application on the GPU is not nearly as simple as allocating blocks of memory and executing a block of code. Given the goal of fully utilizing the parallelism of the GPU, the programming challenge is to complete as many operations as possible on a block of data before having to read or write memory. Naïvely, this is can be construed as an exercise in ordering instructions from beginning to end of an operation in such a way that as much as possible of a compute intensive function is completed with only local register access. Of course, the real task is not that simple. For example, components of the process which may commute in theory may not commute so well in practice because of sensitivity to round-off error.

Given that a complex function will generally not fit into a single pass from beginning to end, an application generally is broken into a series of passes. This then forces attention on how results from one pass are to be consumed as inputs to a succeeding pass. In this case, memory layout becomes an issue. This layout exercise is complicated by the built-in arrangement of data in graphics memory. In other words, blocks of data are addressed by the GPU as M×N×4 arrays with the by-4 as an implicit $3^{rd}$ dimension of the layout.

Figure 8:
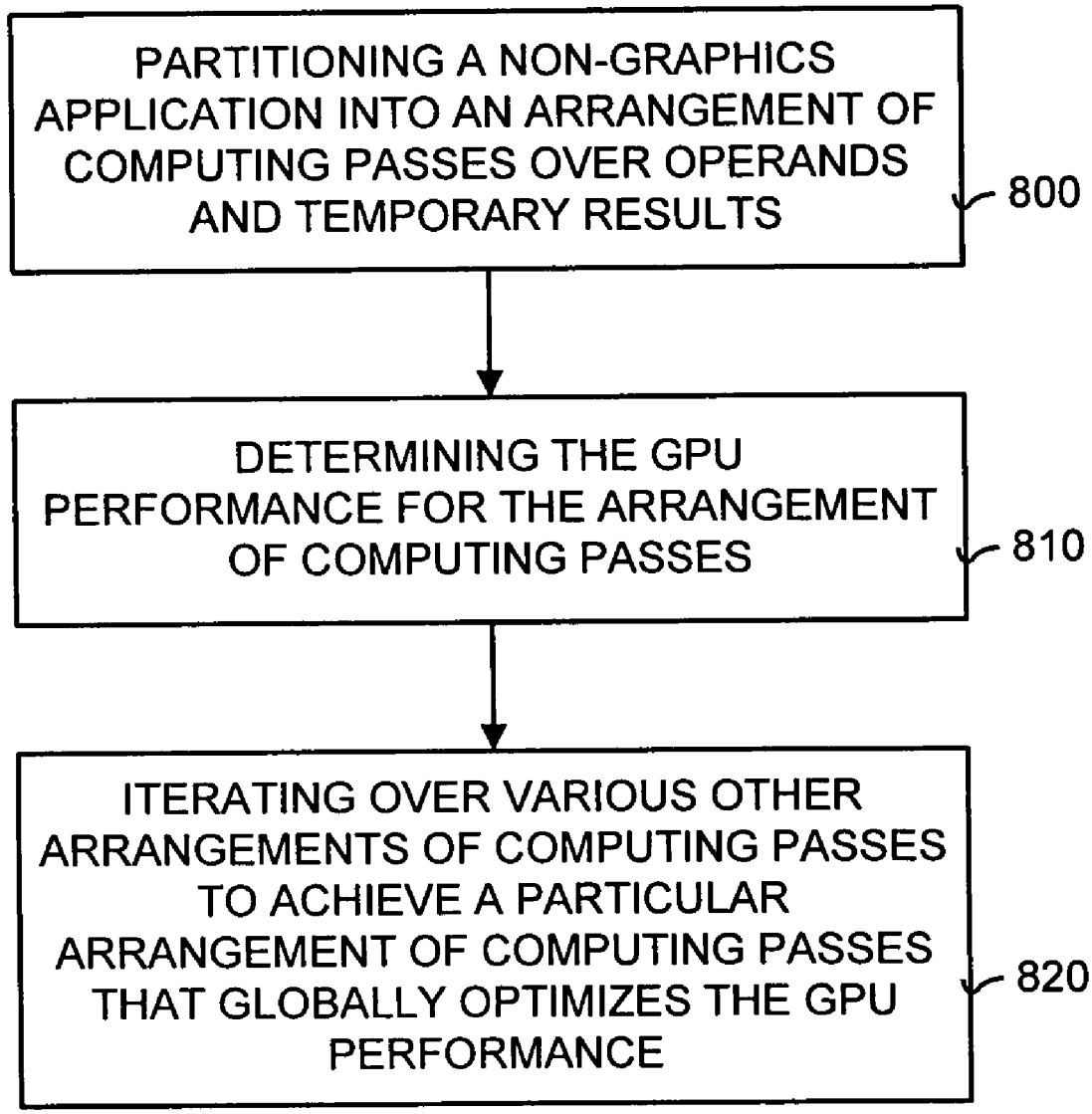
FIG. 8 is a flow diagram illustrating a general operation of the GPU optimization method of the GPU optimization system.

FIG. 8 is a flow diagram illustrating a general operation of the GPU optimization method of the GPU optimization system. In general, the GPU optimization method optimizes the performance of a GPU for matrix operations and other types of applications. Referring to FIG. 8, the GPU optimization method begins by partitioning a non-graphics application into an arrangement of computing passes over operands and temporary results (box 800). The operands are inputs the overall process and the results are the inputs and outputs of each of the subsequent computing passes. Next, the GPU performance for that particular arrangement of computing passes is determined (box 810). Finally, an iterative process is performed over other arrangements of computing passes until a particular arrangement of computing passes is found that globally optimizes the GPU performance (box 820).

Global optimization means that the entire arrangement of computing passes optimizes the GPU performance. This is in contrast to local optimization, which is optimizing each of the computing passes. Thus, the entire chain or arrangement of computing passes is optimized. This amounts to finding the local minimum for an arrangement of computing passes under the constraint that each of the passes must fit into the GPU memory.

In order to achieve global optimization, the following steps may be followed. First, an arrangement of computing passes is generated whereby each of the local computing passes (or operations) is optimized. Next, a memory layout for each operation is changed toward the goal of globally optimizing the arrangement of computing passes. In a test implementation, the memory layout changes are to attempt to match an output of a computing pass with an input of an immediately subsequent computing pass. In this manner, a particular arrangement of computing passes can be found that globally optimizes GPU performance.

As noted above, every function evaluation produces a 4-vector. Consequently, the construction of an arrangement of computing passes (or execution passes) requires projecting backwards from the result as follows:

1. Specify the 2D output destination region in the workspace.
2. Specify the function (i.e. the fragment shader program) to compute the output at each destination position
3. Specify up to 8 interpolated 2D values (texture indices) to be interpolated across the output region.
   a. These interpolated texture indices can be used as addresses into the table of operands, or
   b. The interpolants can be used directly as operands, or
   c. The texture indices can further be incremented to obtain additional shifted versions of the operands (arrays).

With this specification in place, the interpolation of a polygon across the destination region constitutes a do loop around the function. Taken together, these components make up a pass through the computation.

Taking into consideration all of the factors noted above, the matrix multiply example can be used to show how to 1) partition the task into passes, 2) order operations within a pass, and 3) determine layout of inputs and outputs. Then, iterate over possible alternatives to partitioning, ordering, and layout to maintain maximum throughput.

Memory Layout/Layout for SIMD

The key to optimization of GPU performance is to make maximum use of SIMD parallelism in the GPU pixel shaders. This requires that the operands (the inputs to the overall process) and the intermediate results (the outputs from and inputs to intermediate computing passes) be stored in memory in an arrangement that supports SIMD execution. The 4-component parallelism of GPUs is an additional axis of arrangement that must be considered when optimizing for SIMD execution. In addition, this GPU optimization is subject to constraints imposed by current GPU architectures.

Figure 9:
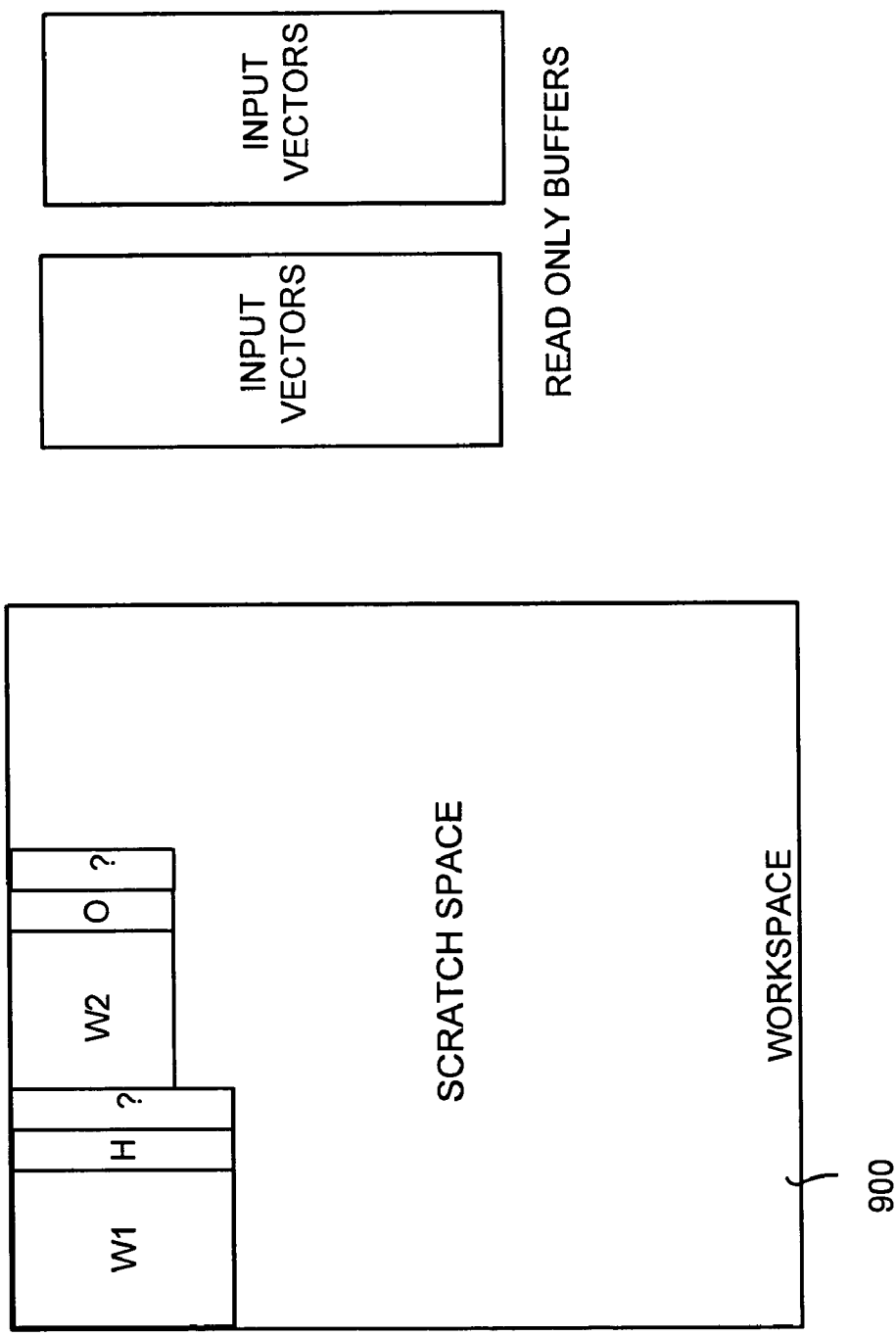
FIG. 9 is a block diagram illustrating the segmentation of the graphics memory.

Program access to graphics memory differs in several ways from memory access from conventional CPUs. FIG. 9 is a block diagram illustrating the segmentation of the graphics memory. As shown in FIG. 9, the graphics memory 900 is segmented (such as being accessed in 2K×2K chunks), accessed with two dimensional addresses, and each reference is to a floating point 4-vector. For general purpose programs, the read/write memory is constrained to a 2K×2K workspace. Additional read only buffers (segments) outside this workspace may be used as input data.

In FIG. 9, part of the scratch space is temporary buffer and part is a permanent buffer. By placing everything into a single scratch space, the space where the optimization GPU method is reading from and writing to never has to change. However, it can vary within the scratch space.

In order to efficiently use all the arithmetic units 4-way SIMD is used. For this reason, in a tested implementation the mad (multiply/add) approach is used. In other words, the optimization GPU method seeks to optimize for the 4-way SIMD case. This means that a matrix must be turned into a floating 4-matrix. For efficiency, there should be four elements of a column or row that are blocked. This is the main optimization criteria.

The orientation of the layout of the four vectors must also be determined. In other words, is it best to lay out the vector in a row or a column. In some cases the matrix must be transposed, as shown in FIG. 7.

By iterating over alternative arrangements of computing passes and the memory layouts of their intermediate results, an arrangement of computing passes can be defined such that the outputs of one computing pass are arranged in an appropriate order to serve as the inputs of the next computing pass such that the best possible throughput is achieved for the entire arrangement of computing passes. This is the optimized global GPU performance.

Figure 10A:
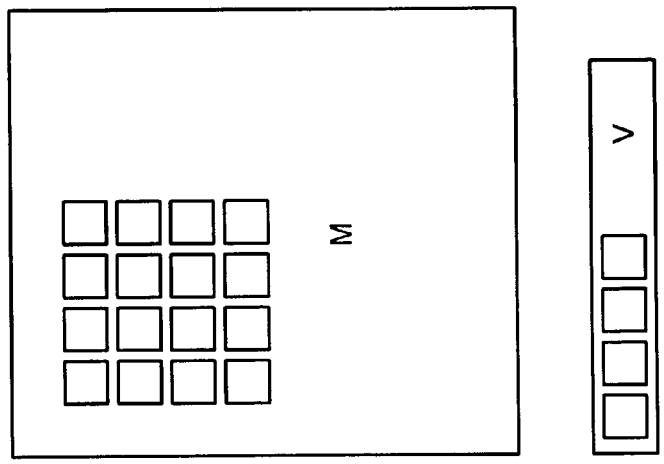
FIG. 10A illustrates an example of the mad (multiply/add) approach of memory layout.
Figure 10B:
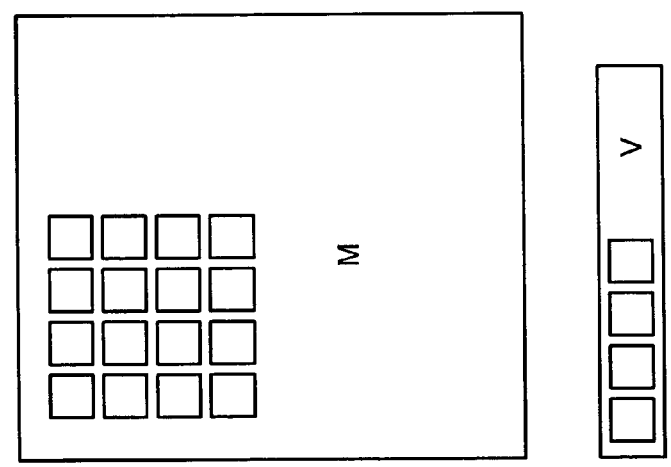
FIG. 10B illustrates an example of the dot product 4 (DP4) approach of memory layout.

In addition to the constraint of fitting all results, including intermediate results, in the fixed size workspace, a programmer must consider the optimal layout for exploiting the SIMD parallelism of the fragment shader. FIGS. 10A and 10B illustrate two examples of a memory layout. FIG. 10A illustrates the mad (multiply/add) approach, while FIG. 10B illustrates the dot product 4 (DP4) approach. Typically, the mad approach is faster than the DP4 approach.

As shown in FIGS. 10A and 10B, the 4-way parallelism of each memory location can either be distributed across columns (left) or rows (right) of the matrix. In FIG. 10A, M1 is a column vector having 4 elements, and R0 is a column vector having 4 elements. In FIG. 10B, M1 and R0 are row vectors having 4 elements.

As shown in FIGS. 10A, in actual execution, the code fragment on the of the mad approach exploits the SIMD processing of the fragment shader and the distribution of 4-vector components of each pixel along columns of the matrix is therefore the preferred layout in memory.

While either memory layout can be used with the associated code fragment shown below it, it has been seen that for the matrix-vector inner product, the layout shown in FIG. 10A leads to a more efficient algorithm. However, the layout shown in FIG. 10B can be used to implement a transposed matrix-vector multiply. This is necessary for the neural net training algorithm, since in-memory transposition of matrices is too expensive. In other words, it involves a complete copy of the largest amount of array data.

It should be noted that it is the total cost of transportation of plus arithmetic operations that determines the overall cost of a computing pass. Even though the execution speed of the code fragment shown in FIG. 10A may be faster, the overall cost may be minimized by executing the code as shown in FIG. 10B when the previous computing pass produces results in an order that fits the code shown in FIG. 10B.

Fundamental Principles

Now that the details of how input data is accessed has been discussed, how instructions in a pass are executed, and how results are written, it is useful to review some basic guidelines for building an application on GPUs:

Maximize the amount of arithmetic computation done for every memory load (to mask load times/bandwidth limitations)

Maximize the amount of computation for every final memory write, since any intermediate memory will have to be re-loaded on the next pass.

Use as many texture maps as possible, i.e., take advantage of the interpolators (up to the hardware limit) to minimize the number of cycles spent in address calculations Find a data layout that supports the above desired goals, but that also plays well with any subsequent passes and/or other parts of the algorithm.

It is often helpful to work backwards as well as forward when thinking about individual passes and how they relate.

Minimize the number of passes because of the associated startup overheads.

Use additional constructs such as constant values or small indexer textures to support memory access modes that are not natural on the GPU.

If necessary, segment the data set into several texture maps, using the best available strategy (GMM example).

The vector outer product and matrix-vector inner product codes described above illustrate these principles. Applying these principles, a general design methodology has been developed that can be used to design a large number of compute-intensive general-purpose algorithms on the GPU.

General Execution Mechanism

The actual mechanism for general purpose computation on GPUs may be summarized as follows:

Iterate Over:
1) Order operations for maximum throughput
2) Partition into passes
3) For each pass
  a. lay out result in graphics memory i. test alternatives for optimal SIMD performance
  b. based on a) determine layout of input data in graphics memory
  c. input data becomes result data for previous pass repeat process The constraint in all of this is that results and inputs all have to fit into a fixed memory space.

Although the parallelism of GPUs may produce dramatic performance improvements, there is an overhead in setting up a new shader and/or rasterizing a new set of geometry within the GPU. Consequently, the number of passes through the GPU should be minimized.

There are reasons for partitioning a program into multiple passes. As noted earlier, the limit on program size forces partitioning. Furthermore, fitting results in memory may require multi-pass execution. A less obvious reason for multiple passes is to match the parallelism of the data layout to the parallelism of the GPU.

VI. Operational Details

Matrix Operations on GPUs

The characteristics of the class of problems that the invention disclosed herein seeks to solve include 1) large matrices or vectors, 2) operations too complex to fit in a single pass, and 3) iteration. In such applications, there is excessive cost for moving data to or from the host CPU. Thus, it is desirable to do as much computation as possible within the GPU and its memory. Using neural net training as a specific example, it can be seen that a number of matrix operations are required.

The iterations to find an optimal arrangement of computing passes are constrained by the need to keep intermediate results in a single workspace (also known as "rendering targets"). In current GPUs, the cost of rendering targets may exceed the savings of acceleration on the GPU. In addition, as noted above, transferring intermediate results out of the graphics memory and back to the CPU memory is quite expensive.

Implementing the Unit Operations

Figure 11:
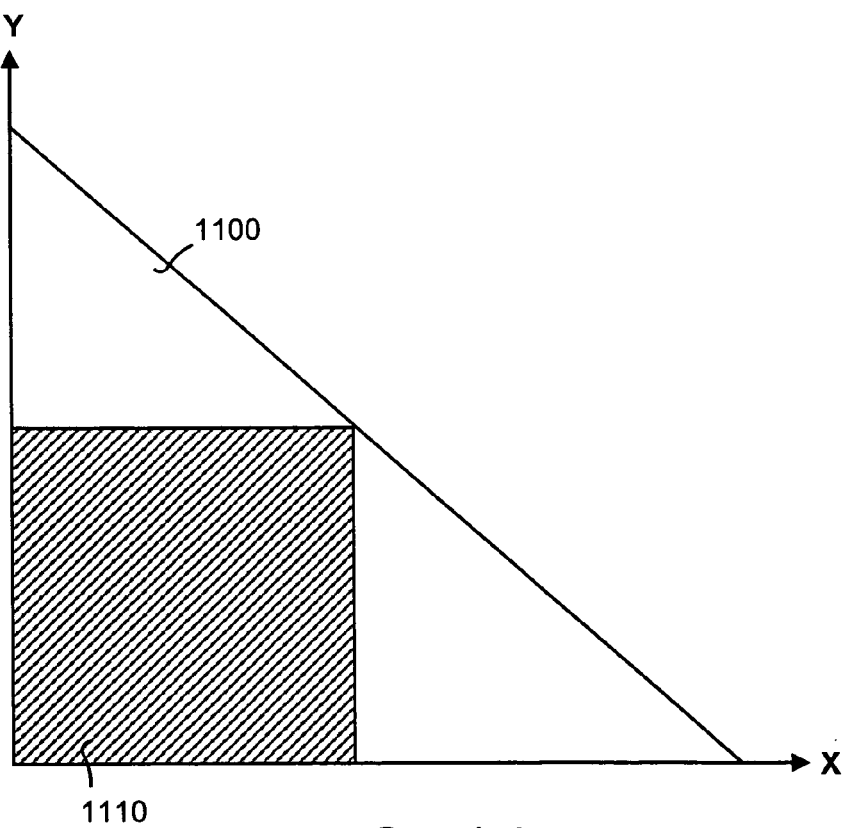
FIG. 11 illustrates the rectangular memory technique used by the GPU optimization system and method.

When implementing the primitive operations outlined above, the first challenge is to make a shader calculate a result that is a rectangle in GPU memory. In other words, the results must be a 2-dimensional matrix of floating-point values (4-vectors). However, pixel shaders render all pixels in a given triangle. To overcome this problem, the GPU optimization system and method specifies a rectangular viewport with the triangle. FIG. 11 illustrates the rectangular memory technique used by the GPU optimization system and method. FIG. 11 illustrates the rectangular memory technique used by the GPU optimization system and method. In particular, FIG. 11 shows a triangle 1100 containing pixels being rendered, and the rectangular viewport 1110. According to the GPU optimization system and method, the GPU will only calculate pixels within the intersection of the viewport 1110 and the triangle 1100. Thus, to calculate a desired rectangular region, the region is specified as the viewport 1010 and is enclosed within the triangle 1000, which becomes the rendering target.

In cases where a vector needs to be rendered instead of a matrix, the same technique applies. The only difference is that a viewport rectangle is specified that is only one pixel tall. Similarly, to render a scalar value, a one-by-one-pixel viewport can be used.

With this technique and the general-purpose programming facilities available within pixel shaders, unary operations like $x=F(x)$ for vectors and arrays can be implemented. For operations that need to read from other operands, the GPU memory organization must be examined. Specifically, DirectX allows a rectangular region of memory to be allocated as a workspace. Referring again to FIG. 5, a workspace 500 is generated in GPU memory. On current hardware, the workspace can be generated from a minimum allocation of a square region of 2048×2048 pixels (each 4-valued). From this subrectangle 510, shader operations can render can fetch operands from other subrectangles such as $t_1$ 520, $t_2$ 530, and $t_3$ 540. These fetches are achieved through an operand read 550.

The mechanism in DirectX that allows this memory organization is texture mapping. Texture mapping arises from the need to put an image onto the surface being rendered. For instance, when rendering the surface of the planet Jupiter, a zebra, or a texture such as a brick wall, one must take into account the pattern drawn on the surface as well as the lighting, angle, reflection, and so forth. For this operation, indices into a rectangular lookup table are bilinearly interpolated across the target area of a rasterized triangle. By treating rectangular areas of the workspace (other than the area being rendered) as textures, they can be mapped onto the destination rectangle. Thus, when calculating a pixel at any x,y location in the destination rectangle, there is access to the values in the geometrically corresponding pixel of the texture rectangle. For example, if a destination rectangle of size a by b pixels is being rendered, another region that is also a by b pixels can be texture-mapped. This will yield direct access, within the shader code, to the source-rectangle values at $a_i$ and $b_i$ that correspond to the $i_{th}$ pixel in the destination. A simple application of this technique allows any matrix, vector or scalar value to be copied to a same-sized matrix, vector or scalar elsewhere in the workspace. Alternatively, a texture region of x pixels by 1 pixel could be mapped to the destination rectangle. This would provide access to a lookup table whose value depends on the x coordinate, but not the y coordinate, of the destination pixel being rendered.

The usefulness of textures can be extended by using arithmetic on register values inside a shader. Registers are local variables which the shader can use to render a given pixel. Their values cannot be shared between pixels (this would break the parallelism assumption) but can be used (locally) for intermediate results. For example, any array or vector can be transposed while copying its values to a new location. Assume a source rectangle whose left, right, top, and bottom coordinates are l, r, t, and b. Then specify a texture rectangle whose coordinates are t, b, l, and r. Inside the pixel shader, the x and y texture coordinates are swapped before using them to fetch a value from the source and copy it to the destination. At the end of rendering, the destination will contain the transpose of the source.

Referring again to FIG. 7, the rendering of a current pixel of the destination 700 will retrieve texture coordinates (15, 7) from a texture rectangle 710 in a specified source vector 720. Before fetching a texture value, the row and column coordinates are reversed so that the value from texture rectangle 730 having location (7, 15) is actually read, which is located inside the actual true source vector 740 being transposed.

DirectX allows texture mapping to be used to map more than one source rectangle to the current destination. At least 8 such mappings can be used in each pass in current hardware. With multiple sources, operations such as (vector A–vector B→vector C) can be implemented. At each pixel in C, the texture-mapped values from A and B are fetched, elementary math is performed on register values, and the results are stored.

Texture-mapping from two vectors to a matrix also provides a way to implement an outer product (vector A*vector B→matrix C). Let vector A be a row vector, one pixel wide, and B a column vector, one row tall. Texture-map these degenerate rectangles to the rectangle of matrix C. Then, when rendering the pixel x,y of C, the texture sampling will yield the $y_{th}$ element of A and the $x_{th}$ element of B, which are just the values needed to multiply and store.

Using the Four Components

Before discussing the implementation of the inner product, each of the unit operations will be discussed in light of the fact that the GPU workspace has 4 components. These components arise because each pixel consists of x, y, z, and w values. The labels x and y here should not be confused with x and y in reference to pixel coordinates in the discussion above. The four components are used conventionally to store coordinates in 4-dimensional object space. The GPU optimization system and method exploits this feature of the GPU programming model and hardware to perform computations faster. It would be possible to ignore three of the components and do all of the calculation in, say, the x plane, but the resulting simplification of programming would come at a high performance cost.

In order to exploit the components, the mapping of the pixel planes to locations in mathematical arrays or vectors is defined. For vectors, the simplest mapping is as follows:

pixel 0:x→element 0
pixel 0:y→element 1
pixel 0:z→element 2
pixel 0:w→element 3
pixel 1:x→element 4
and so forth.

In order to extend this to matrices, it is observed that each row (or column) of a matrix is a vector. The mapping above is applied to each row (or column). Whether the four components are collapsed into the row dimension, or the column dimension, is a choice that can be made individually for each matrix in a way that simplifies the programming.

Given the mapping from matrix or vector elements to pixels and components, it becomes apparent that copy operations are not affected at all. The shader instructions texld and mov, like many others, operate on a pixel at a time, so they respectively move four values from a texture pixel to a register, and from a register to the destination pixel.

Transpose operations on vectors are also unchanged. The components are always collapsed into the dimension of the vector. In the case of matrices, the code does not change, but it must be noted that the direction of collapse is transposed along with the data.

Mathematical operations can also be adapted. Many shader instructions can be used either on a 4-vector of values or on a single value, with appropriate syntax. For example, exp r1.x, r0.x fetches the x plane of register 0, exponentiates it, and stores the result into the x plane of r1.

Outer Product

The outer product of two vectors can be accomplished with use of all four components, but another new technique must be introduced. This technique, used by the GPU optimization method, is called the indexer texture technique. Generally, this is a way to select the value in just one of the four components of a vector, which has been mapped to elements as described above.

Figure 12:
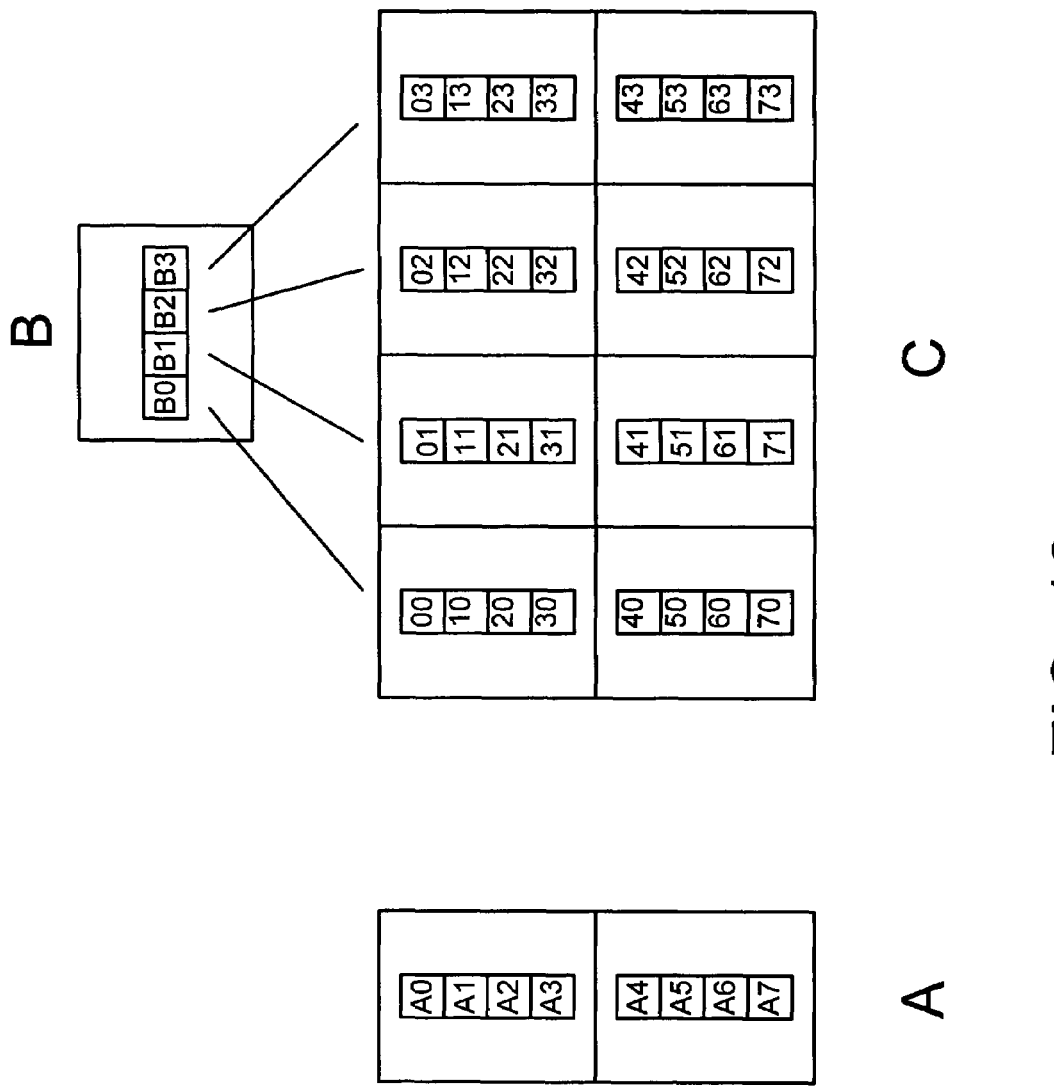
FIG. 12 illustrates how an outer product of two vectors is determined using the indexer texture technique described herein.

FIG. 12 illustrates how an outer product of two vectors is determined using the indexer texture technique described herein. In this example, vector A is a column vector of size a and vector B is a row vector of size b. It is desired to compute the outer product, C, a matrix that is a rows tall and b columns wide. C is to have its four components collapsed into the column, or y, dimension. In other words, in terms of pixels, the memory rectangle for C is b columns wide, but only a/4 rows tall (because each pixel row stores 4 matrix rows). It is required that a be a multiple of 4.

A shader routine is needed that will calculate each pixel of C. The texture mapping is straightforward for A, but not for B. Access to the ith value (not pixel) of B is needed when computing the ith pixel of C. For instance, in the four components of pixel 0, 0 of C, the following values need to be computed:

$C_{0,0} = A_0 * B_0$
$C_{1,0} = A_1 * B_0$
$C_{2,0} = A_2 * B_0$
$C_{3,0} = A_3 * B_0$

This computation can be done in one GPU mul (multiply) instruction. This requires somehow placing the value $B_0$ into the w plane of a register (such as store $A_0$-$A_3$ in r2 and $B_0$ in the w component of r3). Then:

mul r1, r2, r3.wwww

Working back another step, if there was a "bitmask" that would single out $B_0$ from its intra-pixel neighbors $B_1$-$B_3$, the dp4 (dot product) instruction could be used to extract the value into the w component of r3. Suppose r5 contains (1, 0, 0, 0) and r4 contains $B_0$-$B_3$ (loaded by the texture mapping for B). Then this instruction will calculate (r4.x*1+r4.y*0+r4.z*0+r4.w*0), which equals r4.x, or $B_0$:

dp4 r3.w, r4, r5

The inner product can be calculated if the value (1, 0, 0, 0) is available when column 0 of matrix C; (0, 1, 0, 0) is rendered, when column 1; (0, 0, 1, 0) is rendered, when column 2 is rendered, and so forth. This is the purpose of the indexer texture technique. The indexer texture technique uses a very small texture that is 4 pixels wide and 1 pixel tall, and is initialized to the following values:

| 1 | 0 | 0 | 0 |
| 0 | 1 | 0 | 0 |
| 0 | 0 | 1 | 0 |
| 0 | 0 | 0 | 1 |

These four pixel values comprise all the "bitmasks" needed to extract individual values from vector B using the technique just described. All that remains is to find a way to make the correct pixel of the indexer texture technique available in each invocation of the shader. In order to accomplish this task, the machine learning GPU execution method uses yet another application of texture mapping.

Up this point, texture mapping has been used in a way that preserves a one-to-one mapping between texture pixels and destination pixels. This was done by defining texture-coordinate rectangles and destination rectangles that contain the same number of pixels. For the indexer texture technique, a texture-coordinate rectangle is defined that is a multiple of the size of the indexer texture itself (which is, by definition, 1.0 by 1.0 texture-coordinate units) as follows. If the width of matrix C is w pixels, a texture-coordinate rectangle is specified for the indexer texture whose width is w/4 (which must be a whole number). As the shader is called at each pixel across the width of C, the indexer texture coordinate will range from 0 to w/4. In other words, as every 4 pixels of C are traversed, the indexer coordinate will change from one whole-number value to the next. If the fractional part of the texture coordinate is considered, for every 4 pixels of C this will range from zero to one. These are exactly the values needed to sample the indexer texture in order to get the correct "bitmask" at each pixel of C:

```
frc r3, t3        // load fractional part of indexer texture
                  // coordinates into register 3
texld r4, r3, s1  // use the texture coordinates in register 3 to
                  // sample the indexer texture
```

Using the above techniques, a pixel shader that will compute the outer product of two vectors is created.

The Inner Product

The inner product is an operation that can be represented as (matrix A*vector B→vector C). The inner product presents a problem because it requires that a sum be accumulated while looping over several values. This goes against the shader architecture, which assumes there is no communication between adjacent pixels. For this reason, an inner product cannot be implemented as a single pixel shader. However, as shown below, the inner product can be implemented by using a series of shaders and some additional memory.

Matrix A, of size a rows by b columns, is multiplied by vector B, a row vector of size a. Note that B would customarily be represented as a column vector, but using a row vector simplifies the GPU computation. Recall that making transposed copies of vectors can be achieved using the machine learning GPU execution method, so this is not an obstacle. The result, C, will be a column vector of height b. It is assumed that matrix A is organized with its 4 components per pixel collapsed into the y (row) dimension as before.

Figure 13:
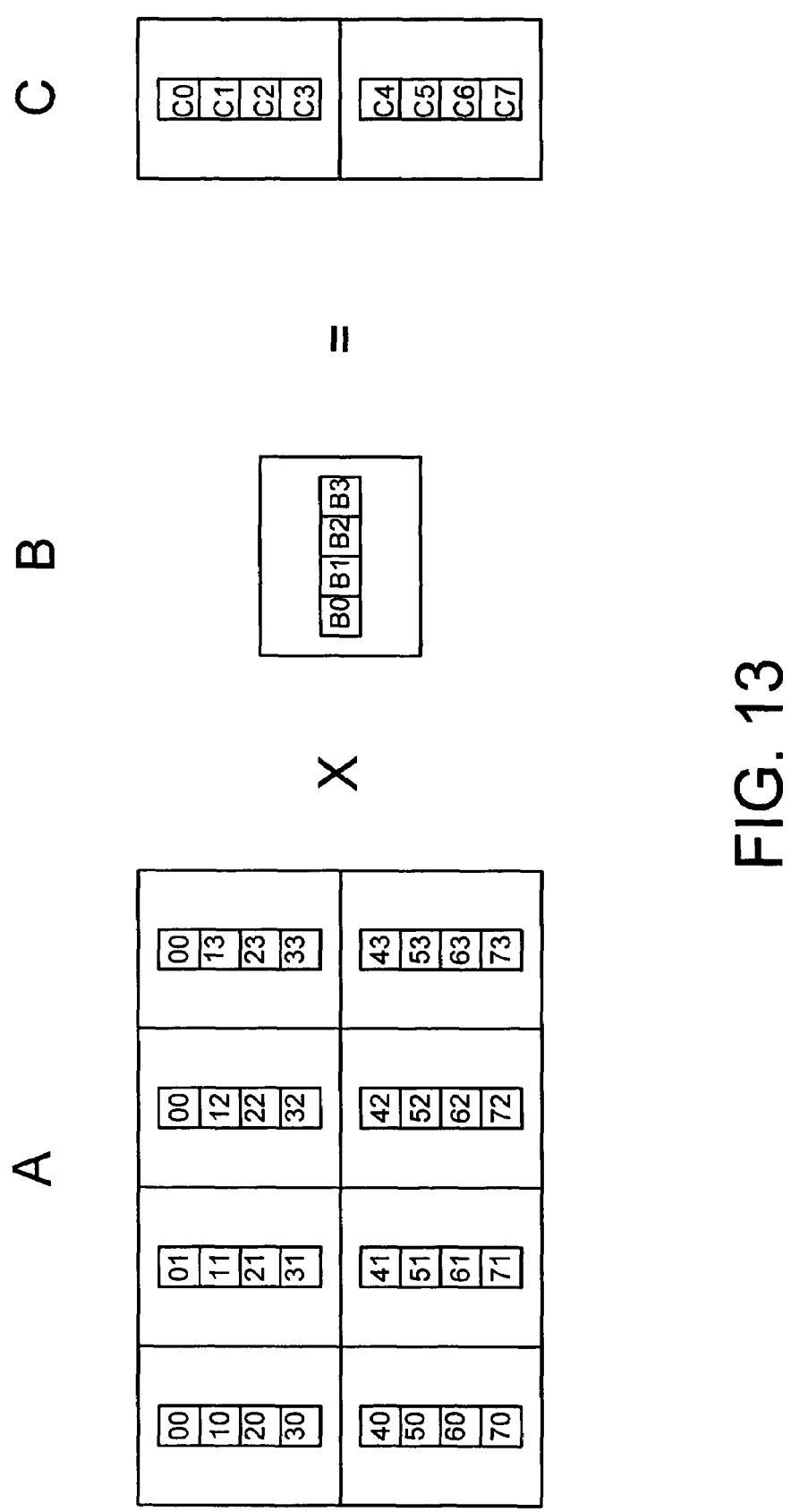
FIG. 13 is a block diagram illustrating the inner product.

FIG. 13 is a block diagram illustrating the inner product. The corresponding equations for FIG. 13 are as follows:

$$C_0 = A_{0,0}*B_0 + A_{0,1}*B_1 + A_{0,2}*B_2 + A_{0,3}*B_3$$

$$C_1 = A_{1,0}*B_0 + A_{1,1}*B_1 + A_{1,2}*B_2 + A_{1,3}*B_3$$

and so forth.

Note the render target, C, is one-dimensional. This defeats the previous approaches, because any texture maps that are defined can only have one value each at any given pixel in C. However, each value in C depends on all the values in B and in one row of A. Thus, another approach must be used to access multiple values from A and B in the shader. This approach first uses multiple texture maps (8 is a reasonable number with current hardware) to efficiently read multiple operands. Second, address arithmetic is used within the shader to read additional operands.

Even with these techniques, a large inner product cannot be calculated in a single rendering pass. This is because pixel shaders cannot use branching or looping, and can contain only a limited number of assembly instructions (such as 96 in one current implementation). Thus, each shader can only do a certain amount of computation before the instruction limit is reached. Fortunately, the inner product can be decomposed into a set of subproblems by restricting the number of columns of A that are consider at a time. This will produce a set of column-vector partial products. These partial products then can be reduced iteratively until obtaining a single column vector containing the inner product result.

The decomposing technique is as follows. First, a shader is created that will multiply a 12-column submatrix of A by a 12-column subvector of B. Eight texture maps are available, and 6 are allocated to A and 2 are allocated to B. The 6 maps for A will all have the same-sized source rectangle, but at six different horizontal offsets, from 0 to 5 pixels. This will yield direct access to the first 6 columns of the matrix (recalling that 1 pixel equals 1 column in the horizontal direction). The two maps for B will also be offset by 1 pixel, giving direct access to the first 8 columns of B (where 1 pixel equals 4 columns).

The shader procedure is run for the 12-column partial product with a destination rectangle that uses temporary (scratch) memory in the GPU. The shader procedure, which calculates four rows (one pixel) of C at a time, is as follows:

a) Use the texld (texture load) instruction 4 times, with 4 texture maps offset from one another horizontally by one pixel, to load the first four pixels of A into registers. Each pixel contains four row values. Use another texid to load one pixel (4 columns) of B.

b) Use mul to store the first 4 products into register 0. This calculates, for the first pixel rendered, $A_{0,0}*B_0, A_{1,0}*B_0, A_{2,0}*B_0$, and $A_{3,0}*B_0$. The notation xxxx means to use the x component of register 1 (namely $B_0$) for all four products:

mul r0, r1.xxxx, r2 c) Use mad (multiply/add) to accumulate the next 4 products into register 0. This accesses the second horizontal pixel of A (via r3), and adds, to the previous results, the products $A_{0,1}*B_1, A_{1,1}*B_1, A_{2,1}*B_1$, and $A_{31}*B_1$. We use yyyy to access $B_1$:

mad r0, r1.yyyy, r3, r0 d) Use mad twice more in the same way to accumulate the next 8 products:

mad r0, r1.zzzz, r4, r0 mad r0, r1.wwww, r5, r0 e) Now, prepare for the fifth through eighth columns (column numbers 4-7). Columns 4 and 5 are already accessible by the remaining two texture maps of the 6 that were allocated to A. For columns 6 and 7, take the coordinates for column 6, and twice add the constant c0, which have been set to equal one pixel (or $\frac{1}{2048}^{th}$ of the workspace's width). These coordinates are stored for columns 6 and 7 in additional registers. Then, four texld instructions are used to store these values, namely $A_{0,4}$ through $A_{3,7}$, in registers.

f) Using the second texture map that was allocated for B, which was offset by 1 pixel, values for $B_4$ through $B_7$ (one pixel's worth) are loaded.

g) Four mad instructions are used to accumulate 16 more products into the four running totals stored in r0, as was done in steps (b) through (d).

h) Now, preparations are made for the last four columns of the partial product. At this point, all the texture maps have been used. Thus, the address of column 7 is obtained, which is still in a register, and C0 is successively added to this value four times. The results are stored in registers. The same procedure is performed to add C0 to the register containing the address of the second pixel of B. This includes advancing it one pixel so as to access $B_8$ through $B_{11}$. Once the correct coordinates are in registers, texld is used again to load the values for $A_{0,8}$ through $A_{3,11}$ and $B_8$ through $B_{11}$ into other registers.

i) Four more mad instructions are used to accumulate the last 16 products into r0. Now r0 contains the values for elements C0 through C3 of the 12-column partial inner product. The shader routine then is complete. The reason that more columns are not processed in this shader is that the per-shader instruction limit would be reached.

The above is a method for calculating a 12-column partial inner product into a column vector in temporary memory. This method can be extended to matrices wider than 12 columns as follows. First, the 12-column partial products are processed as long as the remaining width is 12 or more. Next, the results of these passes directly adjacent to the first partial result are located in a continuous block of temporary memory. Finally, if there are either 8 or 4 columns remaining (recall that the matrix width must be a multiple of 4), a modified shader is used that is written to accommodate either 8 or 4 columns. The techniques for these are simplifications of the 12-column shader.

This results in a block of one or more adjacent column vectors representing partial results. These need to be "reduced", that is, to sum them into a single column vector which will contain the final inner product (and which will be located in a definite location where it can be accessed by other routines, instead of in "scratch" memory). For efficiency, texture maps are used (as opposed to address calculations in registers) to access the partial results needing to be reduced. Using the 8 texture maps as sources, as many as 8 partial results can be reduced at a time. The shader code for this is very straightforward, consisting of texid and add instructions. One way to simplify the process is by the choice of location for reduced, but not final, results. Namely, the reduced results can be put in the next column to the right of the existing partial results. This way, until the very last reduction step, the set of partial results to be reduced is always a contiguous rectangle. With these techniques and sufficient temporary memory, an inner product of arbitrary size can be computed.

The above has shown that the machine learning GPU execution method contains all the operations needed for training neural nets (and any other machine learning algorithm made up of the same operations). Further, these operations can be implemented as pixel shaders on a GPU, and in all cases the algorithms lend themselves to a high degree of parallelism to provide maximum processing efficiency.

VII. Working Example

In order to more fully understand the GPU optimization system and method disclosed herein, the operational details of an exemplary working example are presented. It should be noted that this working example is only one way in which the GPU optimization system and method may be implemented.

In this working example, the GPU optimization system and method was run on a single processor 2.8 GHz Pentium 4 with an ATI® Radeon 9800 graphics card. The 9800 graphics card has 94 locations of instruction memory and 256 MB of working space, 16 MB of which we use for our read/write workspace, the remaining is used for read only data. The CPU-only reference implementations are already optimized to take advantage of the SSE SIMD extensions of the Pentium 4, so the comparisons are SIMD-to-SIMD. Still the GPU acceleration is nearly an order of magnitude for the examples tested.

This working example illustrates the GPU optimization system and method used to perform handwritten character recognition. The task was to find the class ('0' to '9') of a pixel image of a handwritten digit. The training database was made up of 60,000 training images, with their correct labels. This training set is sometimes referred to as MNIST and is available on the web, and is well-known in the machine learning algorithm literature. To solve this task, a neural network approach was used. In particular, the neural network was a 2-layer fully connected neural network.

The use of the GPU optimization system and method to train the two-layer fully-connected neural network by back-propagation was decomposed into the following passes:

Forward Propagation $$W_1 I = H' \xrightarrow{F_1(x)} H$$

Forward Propagation $$W_2 H = O' \xrightarrow{F_2(x)} O$$

-continued

| | |
|---|---|
| Compute Error | $\Delta_2 = (\text{target} - O) * D(O)$ |
| Update Weights | $W_2 \mathrel{+}= \alpha(\Delta_2 \otimes H)$ |
| Propagate Error | $\Delta_1 = (W_2^T \Delta_2) * D(H)$ |
| Update Weights | $W_1 \mathrel{+}= \alpha(\Delta_1 \otimes I)$ |

Here, the forward propagation is a matrix $W_1$ times a vector I followed by a function map ($F_1(x)$. In this case, $F_1(x)$=tanh) to compute the vectors H. Because there are 2 layers in this neural network, the same operations are repeated with $W_2$, H, and $F_2(x)$ (in this case $F_2(x)$=sigmoid), to yield O. More layers could be implemented in a similar fashion. $W_1$, $W_2$ are the matrix of weights for each level of the neural net, I is the input vector, H is the hidden layer vector, and O is the output vector. The error computation is the difference from the target vector and the output vector from the neural network multiplied by derivative of the F(x) function, D(x). Formulae for F(x) and the corresponding D(x) are as follows:

| | Function | Derivative |
|---|---|---|
| Sigmoid | $F(x) = \dfrac{1}{1 + e^{-x}}$ | $D(x) \dfrac{e^{-x}}{(1 + e^{-x})^2} = F(x) * (1 - F(x))$ |
| Tanh | $F(x) = \dfrac{e^x - e^{-x}}{e^x + e^{-x}}$ | $D(x) = \dfrac{4}{(e^x + e^{-x})^2} = (1 + F(x)) * (1 - F(x))$ |

Note that the shader language has exponential functions, which can be applied component by component to a vector, or from the shader's perspective, pixel by pixel.

The weight update was performed by performing an outer product of the error vector and the input vector of the layer. The resulting matrix was scaled by the learning coefficient, $\alpha$, and added into the existing weight matrix. To propagate the error up the network, another matrix vector multiply was computed. Namely, the transpose of the weight matrix with the error vector was computed, again scaled by the D(x) function.

To summarize, the following operations were implemented on the GPU using the GPU optimization system and method:
1. matrix*vector→vector (inner product)
2. x=f(x) for each element of a vector (where f is either tanh or the logistic function, or their derivatives)
3. vector A−vector B→vector C
4. vector*vector→matrix (outer product)
5. matrix A+constant*matrix B→matrix A
6. matrix transpose
7. copy (matrix or vector) to a new location within GPU memory
8. copy (matrix or vector) from CPU memory to GPU memory, or vice-versa (this is directly supported by DirectX, and mentioned only for completeness).

Each of these operations is performed done in a pass, sometimes multiple passes when the limitation discussed above prevent us from computing the operation in a single pass. Actual execution in the GPU requires that the list of passes be created in a preprocess. This list can be created manually or automatically. Moreover, the individual functions must be compiled and downloaded to the GPU (also in the preprocess), the input and training values must be downloaded to the working space in graphics memory, and then the triangle and viewport must be downloaded and the function specified for each pass. Each of these steps was implemented through calls to the Direct 3D (D3D) graphics API. Note that downloading the triangle and viewport initiates execution of a pass. As noted above, rendering the clipped triangle in the GPU constitutes an implicit per-pixel DO loop. The particular fragment shading process for each pass was coded as a property of each polygon. For iterative training, this sequence was repeated for each iteration. Throughout the iterations, there is no need to read back data from the graphics memory to the CPU unless the programmer wishes to monitor progress. Graphics memory to host memory transfers are slow in current hardware and programmers typically avoid such operations.

Accelerating Machine Learning via CPU

Machine Learning Problem Description

Figure 14:
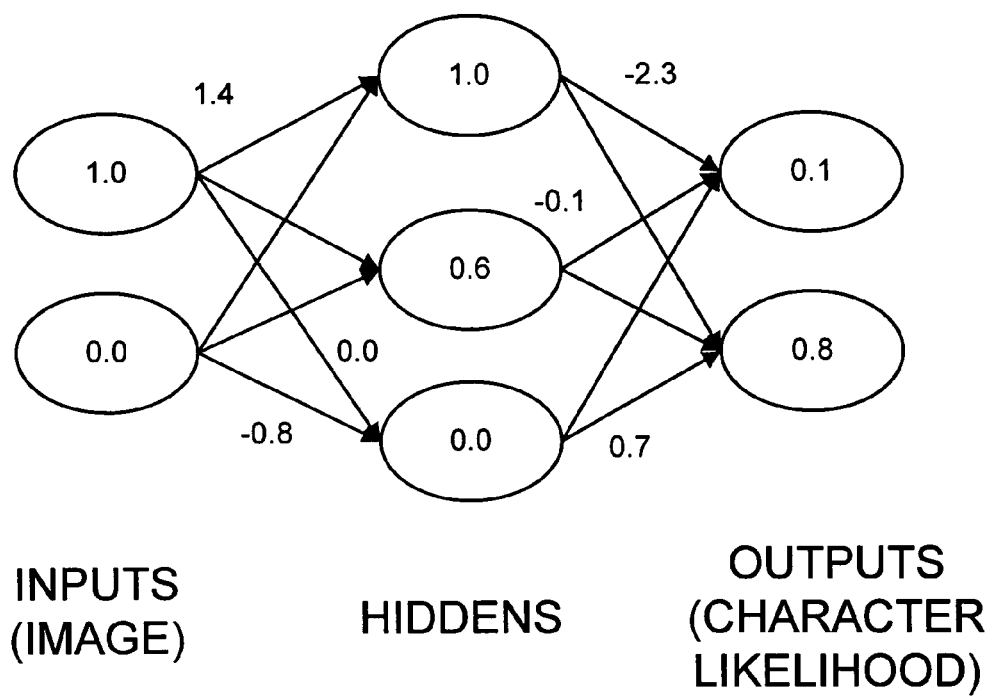
FIG. 14 is a detailed illustration of a pair of layers in a neural network used in the working example.

A number of machine learning techniques contain, as a kernel, computation that can be cast as very large matrix operations. Of particular interest are large matrix/vector multiplies. By way of example, neural networks used for handwriting recognition typically contain a pair of layers. FIG. 14 is a detailed illustration of a pair of layers in a neural network used in the working example.

Referring to FIG. 14, calculation of hidden variables is cast as a matrix multiply followed by a mapping step as given in:

$$[w][i] = [o'] \xrightarrow{f(x)} [o]$$

where $$f(x) = \frac{1}{e^{-x} - 1}.$$

Two such layers are cascaded to produce a result. Vector sizes for inputs, hiddens, and outputs range into the thousands. Although FIG. 14 and the above are based on neural networks, it should be noted that a number of other machine learning problems fit the general model of repetitive operations on large floating point vectors given above.

The Life Cycle of Neural Network Training Using the GPU

In this section, an embodiment of the invention used to do handwritten character recognition will be discussed. The task is to find the class ('0' to '9') of a pixel image of a handwritten digit. The training database is made up of 60,000 training images together with their correct labels. This training set is sometimes referred to as MNIST and is available on the web, and is well-known in the machine learning algorithm literature. To solve this task, a Neural Network approach is used, and in particular a simple 2-layer fully connected network.

Figure 15:
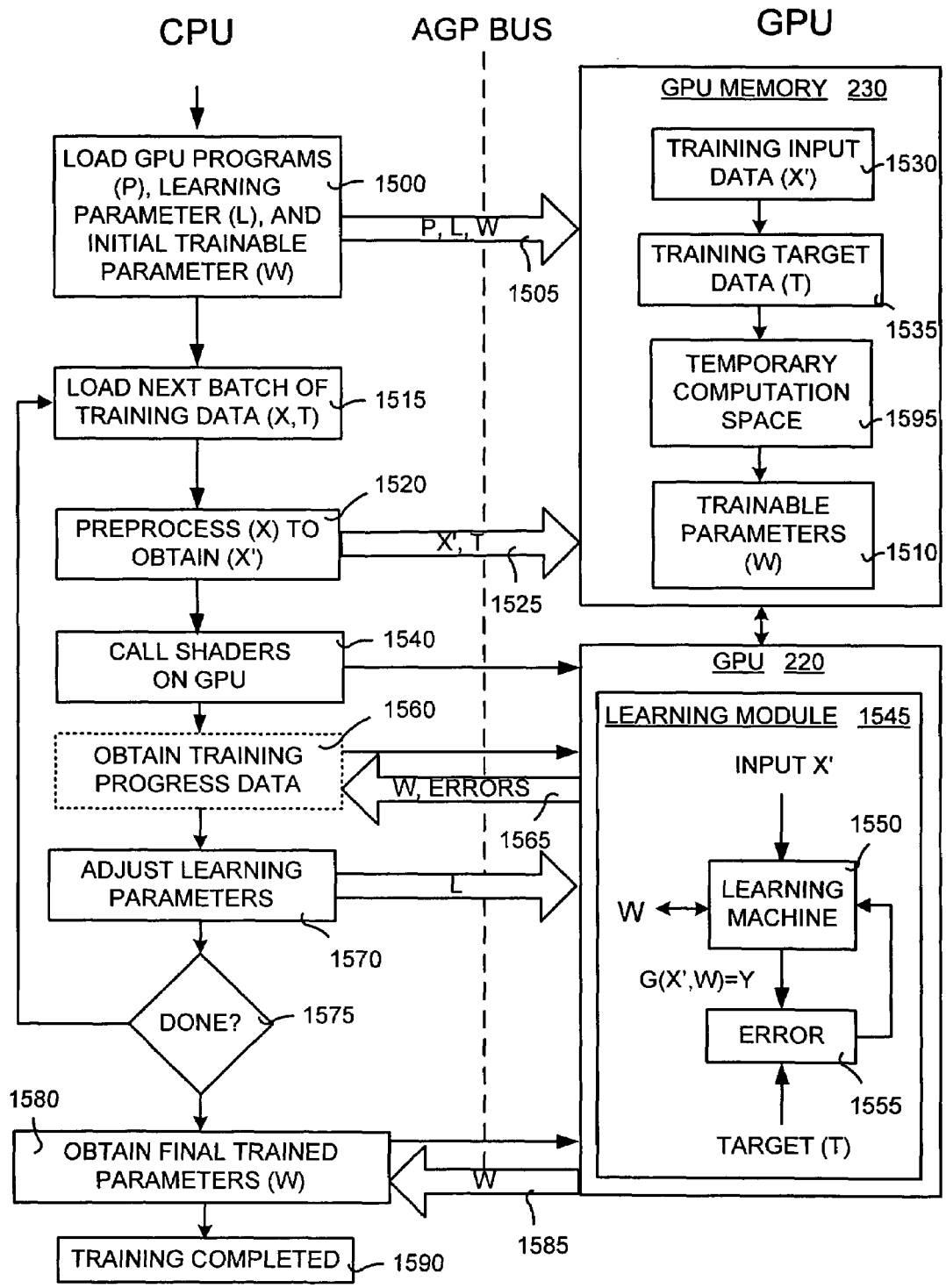
FIG. 15 is a flow diagram illustrating an example of the data flow and control structure of a training session performed on the graphics processing unit in the working example.

FIG. 15 is a flow diagram illustrating an example of the data flow and control structure of a training session performed on the graphics processing unit in the working example. Note that the FIG. 15 is not specific to neural network training: many other learning algorithms (SVM, K-means, LVQ, EM, etc.) can use the same architecture. In this example, the CPU gives instruction to the GPU and blocks until the GPU complete these instructions. It is also possible to have the CPU and GPU compute at the same time.

The first step is to load the shaders, initial weights, and other learning parameters on the GPU (box 1500). Data transfer from CPU to GPU is relatively expensive, so the CPU pre-loads as much as possible onto the GPU before entering the training loop. In this example, the learning parameters are the weights of each of the neural network layers, and the threshold of each unit. The learning parameter is a single scalar called the learning rate. The programs P are for the different shaders used for the forward and backward propagation, and for the weight updates (box 1505).

In the next step, the CPU starts to loop on the training data (box 1515), and accumulates groups of training data. The reason for the groups is that there is a cost of initiating a data transfer between CPU and GPU. Transferring the data by groups of several patterns at a time is more efficient. In our training session, the groups consist of 500 patterns. The patterns are pairs of 28 by 28 pixels images (X) and their target labels (T).

Next, pre-processing is performed whereby X is transformed into X' and X' is sent to the GPU instead of X (box 1520). The pre-processing can have many different functions such as putting the data in better form (normalization), extracting intelligent or complex features, generating distortions (enriching the data set), and so forth. In theory, the pre-processing could be done either on the GPU or the CPU. In practice, it is much easier to program on the CPU than the GPU. This means that if the preprocessing is computationally inexpensive, it is much easier to run it on the CPU. In some cases, certain operations may not be easily, efficiently, or at all be implementable on the GPU, and must therefore run on the CPU. In our case, the preprocessing is used to generate artificial data (translation, rotation, etc) from the original data. This process is known to improve generalization.

Note that it is possible to include trainable parameters in the pre-processing, even if they are part of the global optimization and trained in conjunction with the learning parameters that reside on the GPU. The difficulty with this is that information (e.g. error gradients, negative feedback, etc) must be communicated from the GPU back to the CPU to update those parameters that reside on the CPU, possibly after each pattern, so that the next pattern can profit from the updated pre-processing. Today, dataflow from GPU to CPU is not efficient, since graphic cards are typically designed to send data to the screen, but not back to the CPU. As a result, with the current architecture, it is preferable to keep all the learning parameters on the GPU. This is the case in our example. This limitation may go away in the future. The current algorithm can be modified accordingly by allowing error signals to flow back to the CPU and update the learning parameters on the CPU. The group size can be modified accordingly. In the extreme, the group size is 1, which means that the training parameters on the CPU are updated after each presentation to the GPU, as soon as the error signal comes back from the GPU.

Once the training data has been loaded on the GPU, the CPU instructs the GPU to run the various shaders that make up the learning algorithm (box 1540). A typical learning algorithm is represented in a box inside the GPU. The learning algorithm computes a function G(X',W) as a function of the preprocessed input X' and the trainable parameters W. The goal is to make this output as close as possible as the target value T. An error 1555 between G(X',W) and T is computed, and error signals (e.g. gradient with respect to W) are sent back to the learning machine. The weights are then updated in order to reduce the error between G(X',W) and T.

For training the 2 layer neural networks, the forward and backpropagation correspond to about twenty different shaders (some of which are called multiple times). The number and complexity of shaders can of course vary depending on the algorithm used. The shaders are called for each pattern in a group (500 times in our case). For stochastic gradient descent, the learning parameters are updated after processing each pattern in the group. For batch gradient descent, the learning parameter gradients are accumulated over several patterns before the learning parameters are updated. Whether stochastic or batch gradient descent is used depends heavily on the application and the learning algorithm (and for some learning algorithms, such as SVM, the questions does not arise). For handwriting recognition and neural networks, stochastic gradient descent is preferable, and this is what is implemented in this example.

The next two processes have been added for generality, so that the CPU can get feedback from the GPU inside the training loop. For instance, the CPU can collect training statistics in order to adjust the learning parameters, or even the frequency of presentation of certain kind of patterns. For instance, with neural networks, it is sometimes desirable to decrease the learning rate as the learning progress. In another class of algorithm called "boosting", the frequency of certain patterns, or their learning influence, can be changed as a function of the errors made by the system. Trainable parameters in the preprocessing can also be modified as a function of error signals from the GPU, as we previously mentioned in the preprocessing section. Finally, the termination criteria can be a function of the performance. The first box, therefore, corresponds to the CPU collecting training data (e.g. errors, gradients, weights, etc) from the GPU, and the following box corresponds to the CPU sending adjustments to the parameters governing the learning on the GPU. In this example, the current weights are periodically transferred from the GPU to run test statistics on the training. Because moving data from GPU to CPU is expensive, this is done as seldom as possible.

Finally, when the training session is completed (box 1590), after a fixed number of iterations, or when a desired error threshold has been achieved, the training is stopped and the learning parameters are downloaded to the CPU and saved.

In this example, the first benefit of running the training session on the GPU rather than on the CPU is a 11× speedup of the training. The CPU was a 2.8 GHz Pentium 4, and the GPU came from the ATI Radeon 9800 PRO.

Using the GPU to Compute Function of Input and Parameters

Figure 16:
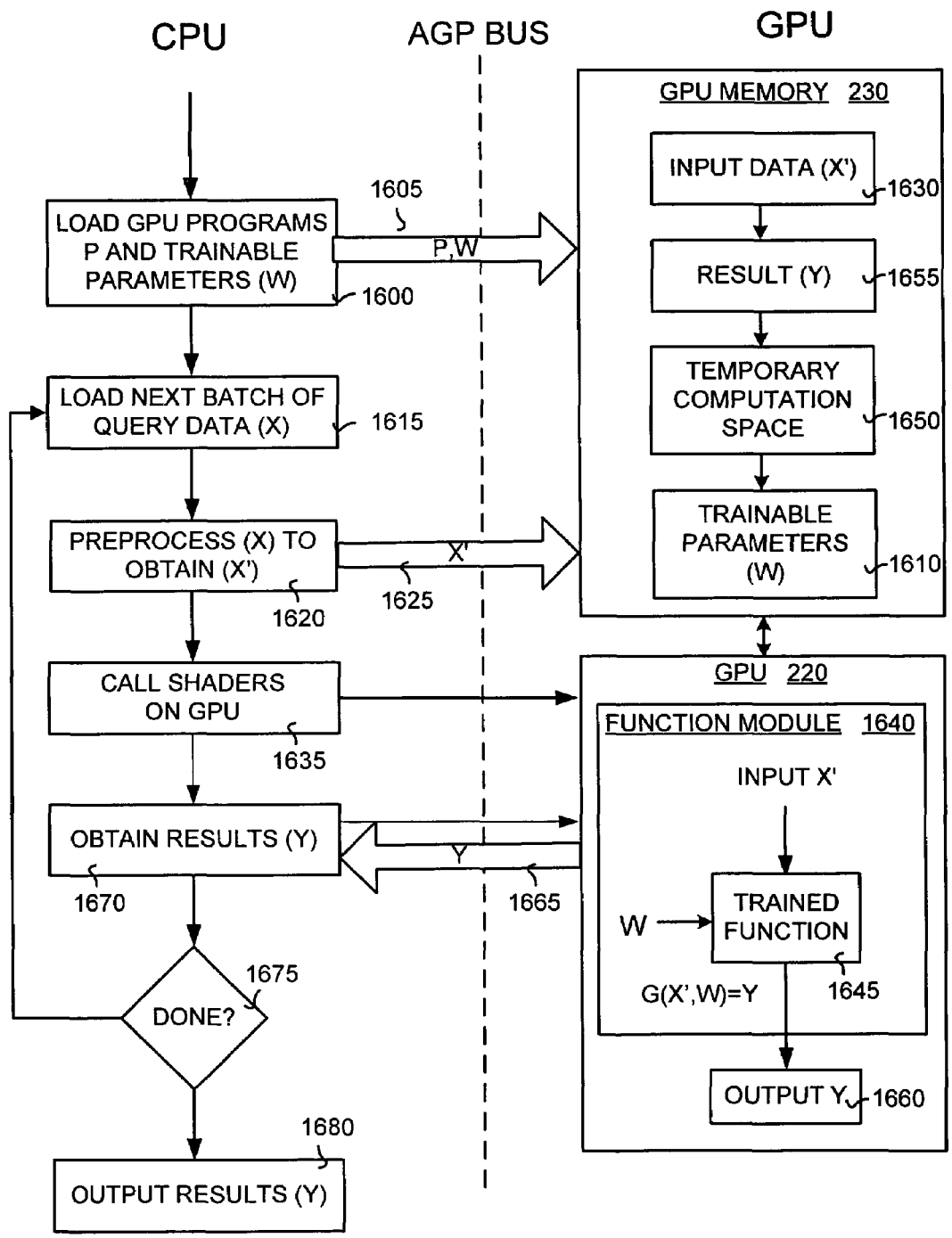
FIG. 16 is a flow diagram illustrating an example of the data flow and control structure of a testing session performed on the graphics processing unit in the working example.

FIG. 16 is a flow diagram illustrating an example of the data flow and control structure of a testing session performed on the graphics processing unit in the working example. FIG. 16 illustrates how to use the GPU to compute a given function G of some parameters W and input X. Note that the parameters may have been computed using a GPU, a CPU, or by any other means. The parameters may or may not be the result of training and in this respect, FIG. 16 is independent of FIG. 15. For the handwriting example, however, architecture very similar to the FIG. 15 is used and shares the data structure and shaders (except that the backpropagation shaders are no longer needed since training is done). The first step is to load the shaders and the "trained" parameters onto the GPU (box 1600). Again, as much downloading and pre-computing as possible should be done outside the recognition/usage loop.

Next group of patterns X is collected on which the function G is computed (box 1615). There is a cost for initializing a communication between the CPU and GPU, so by doing some grouping, we can amortize this cost over several patterns. Before sending the patterns X, we can pre-process them to X' (box 1620). Pre-processing can be done either on the CPU or the GPU, but in practice, it is much easier to do computation on the CPU. So if pre-processing is not computationally too expensive, it is preferably done on the CPU. Pre-processing is useful for normalization, extracting important information/features from the data, etc. After preprocessing, the patterns X' are sent as a group to the GPU (1625).

Next, the CPU instructs the GPU to use the shaders to compute the function Y=G(X',W) (box 1635). A simple diagram illustrates the trained function in the GPU box. The results for each of the patterns of the group are accumulated in the GPU memory (Result Y box in FIG. 16).

Next, the results Y are transferred back to the CPU 1665). Again, transfer from GPU to CPU is quite expensive, so there is an advantage to grouping, and to keeping the size of Y to a minimum. In the handwriting classification example, Y is just the class of the image X, and is therefore very small. The results Y are obtained (box 1670) and a determination is made as to whether the iterations are completed (box 1675). If not, then the iteration begins again. Otherwise, the results Y are output (box 1680).

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A computer-implemented method for programming a graphics processing unit (GPU) to perform processing of a task for a non-graphics application, comprising:
    partitioning the non-graphics application task into a plurality of passes;
    determining a processing order of operations within each of the plurality of passes;
    processing the non-graphics application task using the GPU to obtain results from a previous pass;
    laying out results from the previous pass in a memory of the GPU during a current pass;
    iterating over alternative layouts of the results from the previous pass in the GPU memory during the currrent pass to optimize a single instruction/multiple data (SIMD) performance of the GPU; and
    arranging input and output data in address patterns that fit completely within the GPU memory such that each of the operations can be processed by the GPU.

2. The computer-implemented method of claim 1, further comprising specifying a two-dimensional (2D) output destination region in the GPU memory for placing the output data.

3. The computer-implemented method of claim 2, further comprising:
    specifying a shader fragment program of the GPU; and
    computing an output at each position in the 2D output destination region.

4. The computer-implemented method of claim 2, further comprising specifying 2D values to be interpolated across the output destination region.

5. The computer-implemented method of claim 4, further comprising specifying up to eight interpolated 2D values.

6. The computer-implemented method of claim 4, further comprising using the interpolated 2D values as addresses for a table of operands.

7. The computer-implemented method of claim 4, further comprising using the interpolated 2D values as operands.

8. The computer-implemented method of claim 4, further comprising incrementing the interpolated 2D values to obtain additional shifted versions of operands of the function.

9. The computer-implemented method of claim 1, further comprising placing output data of each of the plurality of passes into a memory of the GPU.

10. The computer-implemented method of claim 1, further comprising iterating over possible alternatives to partitioning, ordering and layout to maintain a maximum throughput for each of the operations.

11. A computer-readable storage medium having stored and encoded thereon computer-executable instructions for performing on a computing device the computer-implemented method recited in claim 1.

12. A process for performing computations for a non-graphics application using a graphics processing unit (GPU), comprising:
   ordering operations of the computations to maximized throughput;
   dividing the computations into a plurality of passes;
   performing the following processes for each of the plurality of passes:
      obtaining results from a previous pass;
      laying out results from the previous pass in a memory of the GPU during a current pass;
      iterating over alternative layouts of the results from the previous pass in the GPU memory during the current pass to optimize a single instruction/multiple data (SIMD) performance of the GPU;
      determining a layout of input date in the GPU memory based on the layout of the results;
      identifying the input data as result data for a previous pass; and
   iterating over each of the previous processes to process each of the operations and return results for the computations.

13. The process as set forth in claim 12, further comprising working backwards from the results from the previous pass to determine a layout of data in the GPU memory.

14. The process as set forth in claim 12, further comprising writing results of each of the plurality of passes to GPU memory in a layout that allows the results from the previous pass to be used as operands in later passes.

15. One or more computer-readable storage media having stored and encoded thereon computer-readable instructions which, when executed by one or more processors on a computing device, cause the one or more processors on the computing device to implement the process of claim 12.

* * * * *